United States Patent
Iwami et al.

(10) Patent No.: US 8,745,432 B2
(45) Date of Patent: Jun. 3, 2014

(54) DELAY CONTROLLER, CONTROL METHOD, AND COMMUNICATION SYSTEM

(75) Inventors: Hideki Iwami, Saitama (JP); Eisaburo Itakura, Kanagawa (JP); Satoshi Tsubaki, Kanagawa (JP); Hiroaki Takahashi, Kanagawa (JP); Kei Kakitani, Kanagawa (JP); Tamotsu Munakata, Kanagawa (JP); Hideaki Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 13/079,208

(22) Filed: Apr. 4, 2011

(65) Prior Publication Data

US 2011/0252265 A1 Oct. 13, 2011

(30) Foreign Application Priority Data

Apr. 9, 2010 (JP) ................. 2010-090961

(51) Int. Cl.
*H04B 1/66* (2006.01)
*H04L 23/00* (2006.01)

(52) U.S. Cl.
USPC ........... 713/503; 714/700; 714/707; 375/240; 375/377; 341/51

(58) Field of Classification Search
USPC ........... 713/503; 714/700, 707; 375/240, 377; 341/51
See application file for complete search history.

(56) References Cited

U.S. PATENT DOCUMENTS

| | | | | |
|---|---|---|---|---|
| 6,590,864 | B1 * | 7/2003 | Suzuki ........................ | 370/225 |
| 2004/0123190 | A1 * | 6/2004 | Toyoda et al. ............... | 714/700 |

FOREIGN PATENT DOCUMENTS

| | | |
|---|---|---|
| JP | 3617087 | 11/2004 |
| JP | 2007-311948 A | 11/2007 |
| JP | 2008-028541 A | 2/2008 |
| JP | 2008-042222 A | 2/2008 |
| JP | 2009-278545 A | 11/2009 |

* cited by examiner

*Primary Examiner* — M Elamin
(74) *Attorney, Agent, or Firm* — Wolf, Greenfield & Sacks, P.C.

(57) ABSTRACT

A delay controller includes an acquiring section that acquires synchronization timings indicating timings when a plurality of controllers, which control via a line a plurality of transmitters that transmit data, synchronously control the transmitters, a determining section that determines a reference synchronization timing serving as a reference for synchronization between the controllers, on the basis of the synchronization timings acquired by the acquiring section, and a synchronization information transmitting section that transmits synchronization information to the controllers, the synchronization information being used when the controllers receive data from each of the transmitters at the reference synchronization timing determined by the determining section.

11 Claims, 22 Drawing Sheets

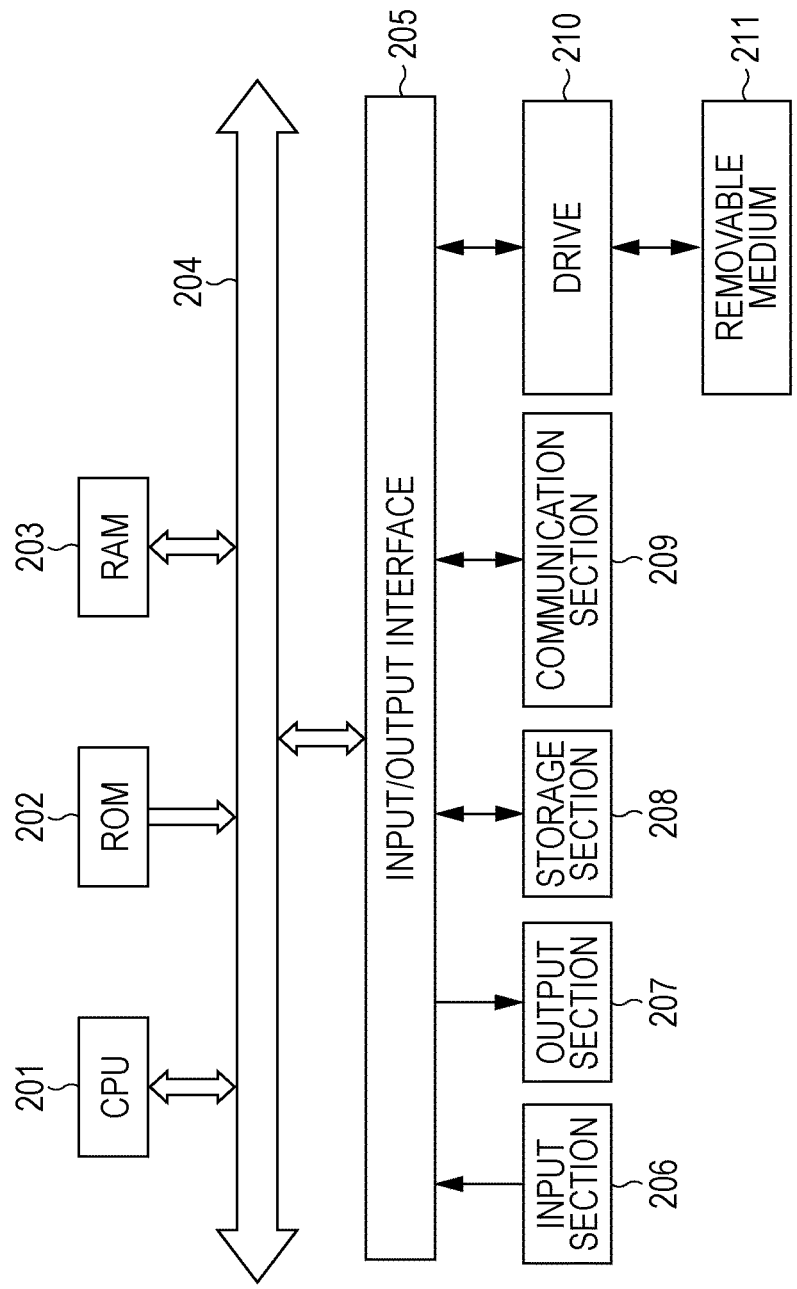

DELAY CONTROLLER, CONTROL METHOD, AND COMMUNICATION SYSTEM

BACKGROUND OF THE INVENTION

1. Field of the Invention

The present invention relates to a delay controller, a control method, and a communication system, in particular, a delay controller, a control method, and a communication system which enable images to be switched at high speed.

2. Description of the Related Art

At present, there is widespread use of applications and services that transfer image data (particularly moving image data) via various networks such as the Internet and LAN (Local Area Network). When transmitting and receiving image data via a network, it is common to reduce the amount of data by applying an encoding (compression) process on the transmitting side before sending the data to the network, and reproduce the encoded receive data by applying a decoding (decompression) process on the receiving side.

For example, there is a compression technique called MPEG (Moving Pictures Experts Group) as the most common approach for image compression. When using the MPEG compression technique, an MPEG stream generated by the MPEG compression technology is stored in IP packets that are compliant with IP (Internet Protocol), and delivered via a network. Then, the MPEG stream is received using a communication terminal such as a PC (Personal Computer), a PDA (Personal Digital Assistants), or a mobile phone, and displayed on the screen of each terminal.

Under such circumstances, for applications mainly aimed at delivery of image data, for example, Video on Demand, live video delivery, video conferencing, and videophones, there are environments where not all data on the transmitting side arrives at the receiving side due to network jitter, and environments where image data is received by terminals with different capabilities. It is necessary to take these environments into consideration.

For example, it is possible that image data transmitted from a single transmission source is received by and displayed on a receiving terminal such as a mobile phone having a low-resolution display and a low-throughput CPU. At the same time, it is also possible that such data is received by and displayed on a receiving terminal such as a desktop PC having a high-resolution monitor and a high-performance CPU.

In cases where the fact that the packet receiving condition varies depending on the network connection environment as described above is to be taken into consideration, for example, a technique called layered encoding is used, whereby encoding of data to be transmitted and received is executed in a layered manner. For image data that has been layered encoded, for example, encoded data intended for receiving terminals with high-resolution displays, and encoded data intended for receiving terminals with low-resolution displays are sorted out and retained, and image size or image quality can be changed on the receiving side as appropriate.

Compression/decompression schemes that enable layered encoding include, for example, video streams based on MPEG4 and JPEG2000. In MPEG4, the FGS (Fine Granularity Scalability) technique is scheduled to be adopted and profiled as a standard specification, and it is said that this layered encoding technique enables delivery of data in a scalable manner from low to high bit rates. Also, with JPEG2000 based on a wavelet transform, it is possible to generate packets on the basis of spatial resolution by exploiting the characteristics of a wavelet transform, or generate packets in a layered manner on the basis of image quality. Also, JPEG2000 enables layered data to be stored in file format by the Motion JPEG2000 (Part3) standard that can handle not only still images but also moving images.

Further, as a specific example of data communication that employs layered encoding, data communication based on a discrete cosine transform (DCT) has been proposed. This method executes data communication by applying a DCT process to, for example, image data to be communicated, achieving layering by differentiating between high and low frequencies through the DCT process, and generating packets divided into high-frequency and low-frequency layers.

In many cases, real-timeness is demanded for delivery of such layered-encoded image data. Currently, however, greater priority tends to be given to large-screen, high-quality display than to real-timeness.

To ensure real-time delivery of image data, a UDP (User Datagram Protocol) is typically used as an IP-based communication protocol. Further, an RTP (Real-time Transport Protocol) is used for the layer above the UDP. The format in which data is stored in an RTP packet complies with each individual format that is defined for each application, that is, for each encoding scheme.

As communication networks, communication schemes such as wireless or wired LANs, optical fiber communications, xDSLs, power line communications, or Co-ax are used. While these communication schemes are becoming faster year by year, the image quality of image content transmitted by those schemes is also becoming higher.

For example, the code delay (encoding delay+decoding delay) of a typical system in the MPEG scheme or JPEG2000 scheme which is currently the mainstream is two pictures or more. This makes it hard to say that sufficient real-timeness of image data delivery is ensured.

Accordingly, in these days, image compression schemes are beginning to be proposed which achieve a shorter delay time by splitting a picture into sets of N lines (N is equal to or larger than 1), and encoding an image by each split set referred to as line block at a time (hereinafter referred to as line-based codecs). Advantages of line-based codecs include, in addition to low delay, the ability to achieve high speed processing and reduced hardware scale, because the amount of information to be handled per one unit of image compression is small.

The following are examples of proposals made on line-based codecs. Japanese Unexamined Patent Application Publication No. 2007-311948 describes a communication device that performs a process of appropriately complementing missing data on a line-block basis, with respect to communication data based on a line-based codec. Japanese Unexamined Patent Application Publication No. 2008-28541 describes an information processor designed to achieve reduced delay and higher efficiency of processing when using a line-based codec. Japanese Unexamined Patent Application Publication No. 2008-42222 describes a transmitter that minimizes degradation of image quality by transmitting low-frequency components of image data on which a lined-based wavelet transform has been applied. Since use of line-based codecs has enabled high-image-quality, low-delay transmissions, application of the codecs to camera systems for performing live relay broadcasting is being anticipated. As an example of proposals made for camera systems for performing live relay broadcasting, the present applicant has proposed a system that enhances transmission efficiency by using a digital modulator, as disclosed in Japanese Patent No. 3617087.

Accordingly, as disclosed in Japanese Unexamined Patent Application Publication No. 2009-278545, the present applicant has developed a technique for stably acquiring synchronization in communication using a line-based codec.

SUMMARY OF THE INVENTION

However, when camera systems for performing live relay broadcasting according to the related art are to be adapted to general-purpose lines, such as the Ethernet (registered trademark), Next Generation Network (NGN), and wireless, with high image quality, the resulting increase in delay makes it difficult to perform high speed switching of images, which is the core technology of live relay broadcasting. For example, in the case of broadcasting systems, a high precision is necessary in matching the phases of a plurality of cameras with each other, and it is difficult to achieve both high image quality and high-precision synchronization.

Adaptation to the complexity of camera systems designed for live relay broadcasting is another problem. Currently, in the case of camera systems in which one camera control unit (CCU) is necessary for each camera and which have complex system configuration, it is difficult from the viewpoint of connection and system synchronization to install additional live relay broadcasting control stations with different frame synchronization timings. It is difficult to handle high-precision synchronization timing necessary for genlocking of cameras which is necessary in camera systems designed for live relay broadcasting, while achieving high image quality and low delay.

It is desirable to enable images to be switched at high speed and with low delay.

A delay controller according to an embodiment of the present invention includes acquiring means for acquiring synchronization timings indicating timings when a plurality of controllers, which control via a line a plurality of transmitters that transmit data, synchronously control the transmitters, determining means for determining a reference synchronization timing serving as a reference for synchronization between the controllers, on the basis of the synchronization timings acquired by the acquiring means, and synchronization information transmitting means for transmitting synchronization information to the controllers, the synchronization information being used when the controllers receive data from each of the transmitters at the reference synchronization timing determined by the determining means.

A control method according to an embodiment of the present invention includes the steps of acquiring synchronization timings indicating timings when a plurality of controllers, which control via a line a plurality of transmitters that transmit data, synchronously control the transmitters, determining a reference synchronization timing serving as a reference for synchronization between the controllers, on the basis of the acquired synchronization timings, and transmitting synchronization information to the controllers, the synchronization information being used when the controllers receive data from each of the transmitters at the determined reference synchronization timing.

A communication system according to an embodiment of the present invention includes a plurality of transmitters that transmit data, a plurality of controllers that control the transmitters via a line, a delay controller that controls delay of data transmitted between each of the transmitters and each of the controllers, acquiring means for acquiring synchronization timings indicating timings when the controllers synchronously control the transmitters, determining means for determining a reference synchronization timing that serves as a reference for synchronization between the controllers, on the basis of the synchronization timings acquired by the acquiring means, and synchronization information transmitting means for transmitting synchronization information to the controllers, the synchronization information being used when the controllers receive data from each of the transmitters at the reference synchronization timing determined by the determining means.

A control method for a communication system according to an embodiment of the present invention is a control method for a communication system having a plurality of transmitters that transmit data, a plurality of controllers that control the transmitters via a line, and a delay controller that controls delay of data transmitted between each of the transmitters and each of the controllers, and includes the steps of acquiring synchronization timings indicating timings when the controllers synchronously control the transmitters, determining a reference synchronization timing that serves as a reference for synchronization between the controllers, on the basis of the acquired synchronization timings, and transmitting synchronization information to the controllers, the synchronization information being used when the controllers receive data from each of the transmitters at the determined reference synchronization timing.

According to an embodiment of the present invention, synchronization timings indicating the timings when a plurality of controllers, which control via a line a plurality of transmitters that transmit data, synchronously control the transmitters are acquired, a reference synchronization timing serving as a reference for synchronization between the controllers is determined on the basis of those synchronization timings, and synchronization information, which is used when the controllers receive data from each of the controllers at the reference synchronization timing, is transmitted to the controllers.

According to an embodiment of the present invention, images can be switched at high speed and with low delay.

BRIEF DESCRIPTION OF THE DRAWINGS

FIG. 22 is a block diagram showing an example of the configuration of a computer according to an embodiment of the present invention.

DESCRIPTION OF THE PREFERRED EMBODIMENTS

Hereinbelow, specific embodiments of the present invention will be described in detail with reference to the drawings.
[Description of Encoding Process]

First, an image data encoding process will be described.

Figure 1:
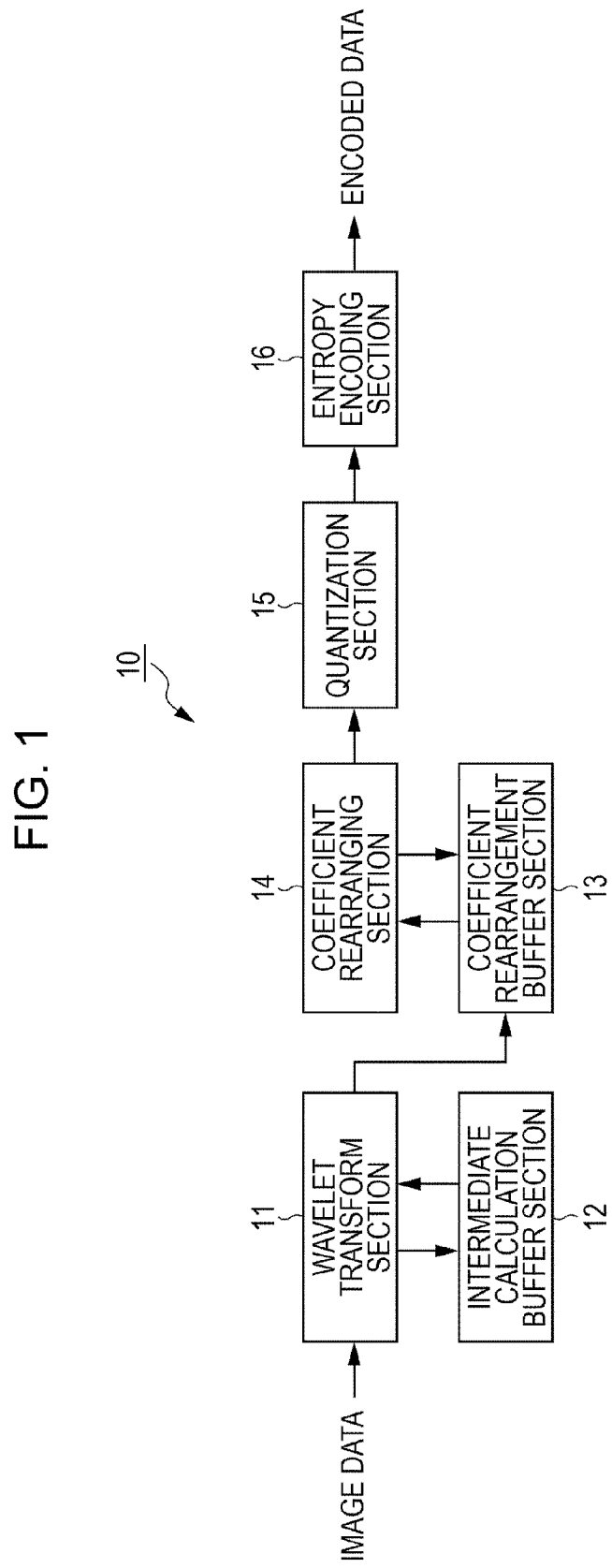
FIG. 1 is a diagram showing an example of the configuration of an encoder that encodes image data.

FIG. 1 is a diagram showing an example of the configuration of an encoder that encodes image data.

An encoder 10 shown in FIG. 1 generates and outputs encoded data by encoding inputted image data. As shown in FIG. 1, the encoder 10 has a wavelet transform section 11, an intermediate calculation buffer section 12, a coefficient rearrangement buffer section 13, a coefficient rearranging section 14, a quantization section 15, and an entropy encoding section 16.

Image data inputted to the encoder 10 is temporarily accumulated in the intermediate calculation buffer section 12 via the wavelet transform section 11.

The wavelet transform section 11 applies a wavelet transform to the image data accumulated in the intermediate calculation buffer section 12. Details of this wavelet transform will be described later. The wavelet transform section 11 supplies coefficient data obtained by the wavelet transform to the coefficient rearrangement buffer section 13.

The coefficient rearranging section 14 reads out the coefficient data written to the coefficient rearrangement buffer section 13 in a predetermined order (for example, in the order of inverse wavelet transform process), and supplies the data to the quantization section 15.

The quantization section 15 quantizes the supplied coefficient data by a predetermined method, and supplies the obtained coefficient data (quantized coefficient data) to the entropy encoding section 16.

The entropy encoding section 16 encodes the supplied coefficient data in a predetermined entropy encoding scheme, such as Huffman encoding or arithmetic encoding. The entropy encoding section 16 outputs the generated encoded data to the outside of the encoder 10.
[Subbands]

Next, a wavelet transform will be described. A wavelet transform is a process of recursively repeating analysis filtering, which splits image data into components of high spatial frequency (high-frequency components) and components of low spatial frequency (low-frequency components), with respect to generated low-frequency components, thereby transforming the image data into coefficient data structured in a layered manner and separated for each individual frequency component. It should be noted that in the following, the splitting level is lower for layers of higher frequency components, and is higher for layers of lower frequency components.

In one layer (splitting level), analysis filtering is performed with respect to both the horizontal direction and the vertical direction. Consequently, coefficient data (image data) in one layer is split into four kinds of components through one layer of analysis filtering. The four kinds of components are components (HH) that are of high frequency with respect to both the horizontal direction and the vertical direction, components (HL) that are of high frequency with respect to the horizontal direction and of low frequency with respect to the vertical direction, components (LH) that are of low frequency with respect to the horizontal direction and of high frequency with respect to the vertical direction, and components (LL) that are of low frequency with respect to both the horizontal direction and the vertical direction. Each set of the respective components will be referred to as subband.

In a state in which four subbands are generated by performing analysis filtering in a given layer, analysis filtering in the next (immediately higher) layer is applied to, among the four generated subbands, components (LL) that are of low frequency with respect to both the horizontal direction and the vertical direction.

As analysis filtering is recursively repeated in this way, coefficient data in a band of low spatial frequencies is narrowed down into smaller regions (lower frequency components). Therefore, efficient encoding is possible by encoding such wavelet-transformed coefficient data.

Figure 2:
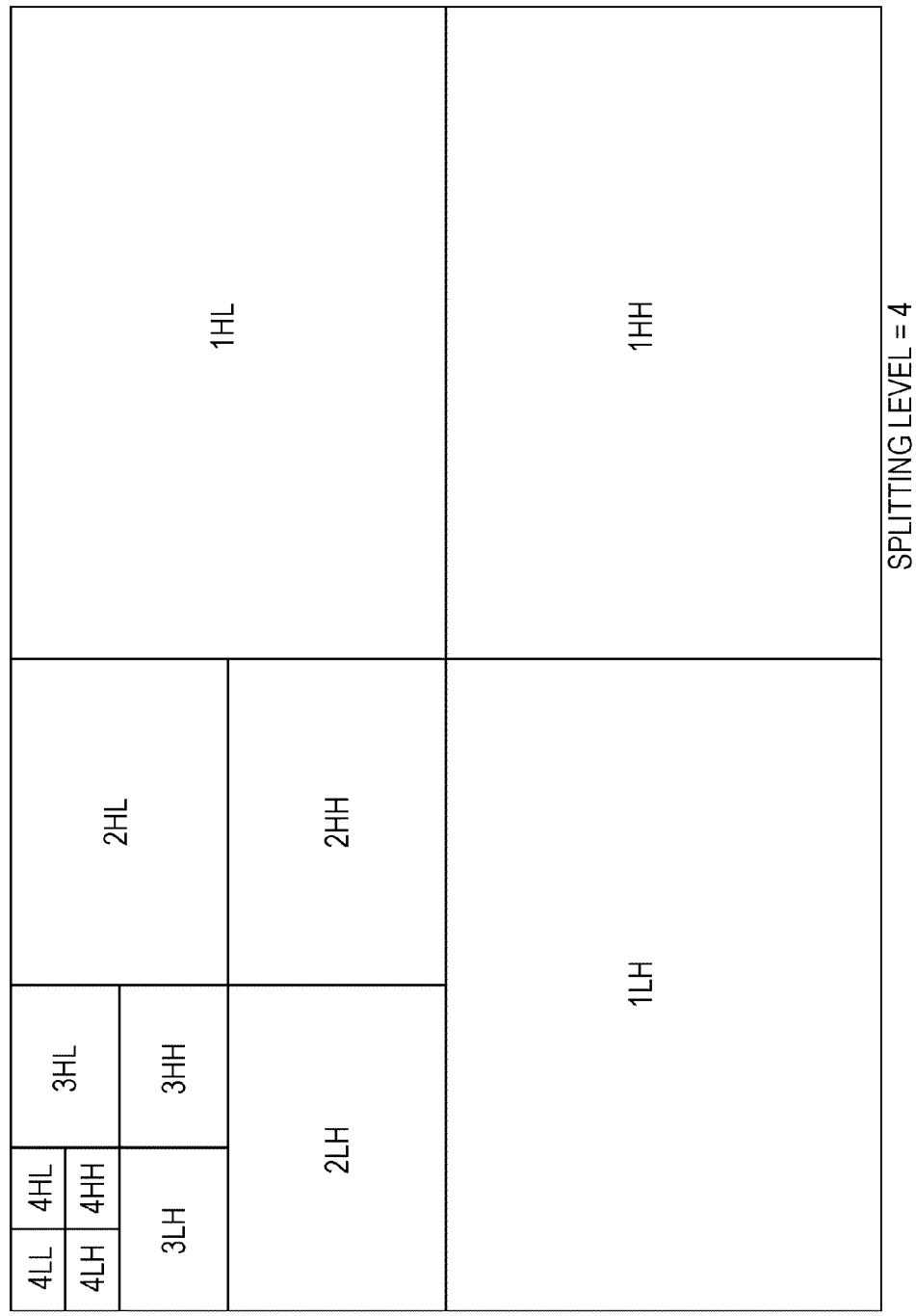
FIG. 2 is a diagram showing the structure of coefficient data that has been split by repeating analysis filtering four times.

FIG. 2 shows the structure of coefficient data split into 13 subbands (1LH, 1HL, 1HH, 2LH, 2HL, 2HH, 3LH, 3HL, 3HH, 4LL, 4LH, 4HL, and 4HH) up to splitting level 4 by repeating analysis filtering four times.
[Line Blocks]

Figure 3:
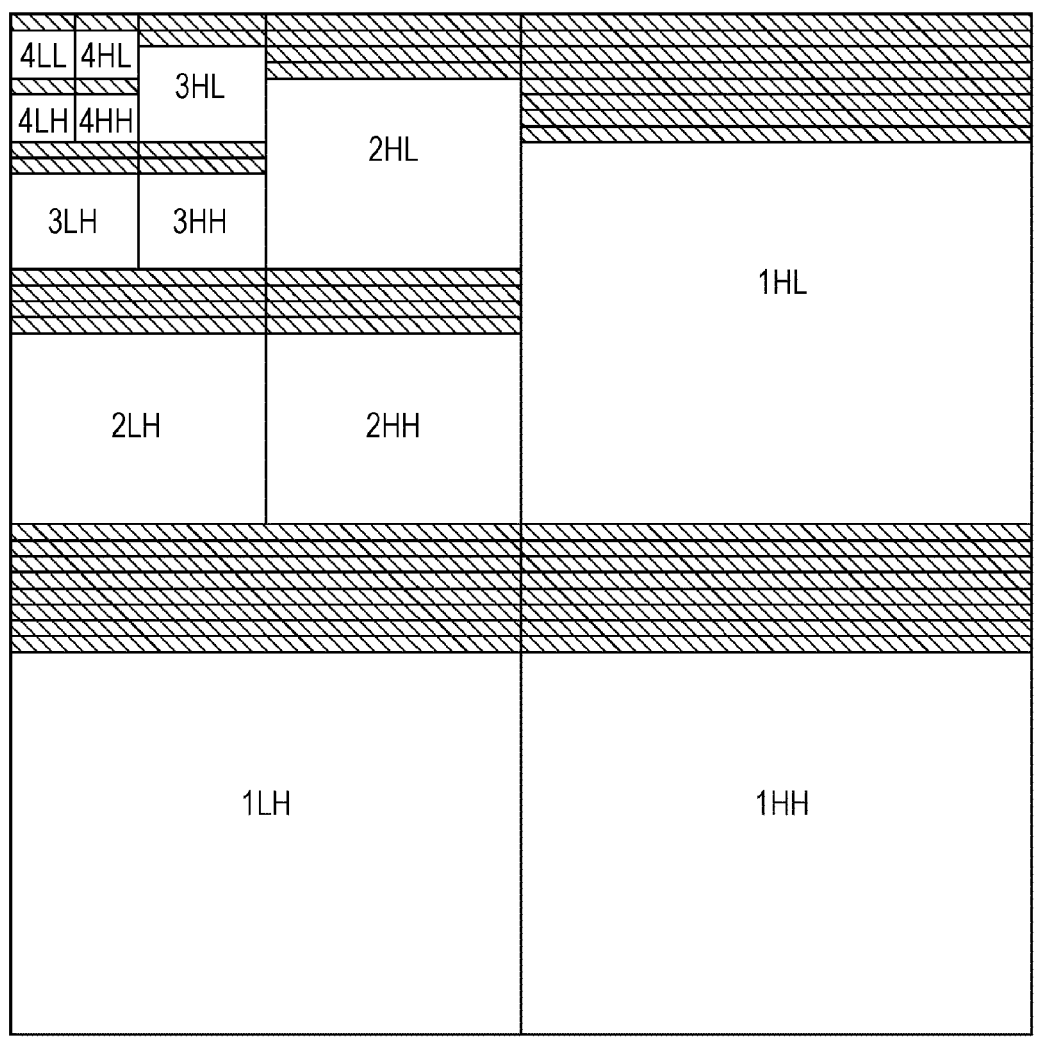
FIG. 3 is a diagram illustrating line blocks.

Next, line blocks will be described. FIG. 3 is a diagram illustrating line blocks. Analysis filtering in a wavelet transform generates coefficient data of the four subbands in the next higher layer from two lines of image data or coefficient data to be processed.

Therefore, for example, when the number of splitting levels is four, as indicated by the diagonal lines in FIG. 3, to obtain one line of coefficient data of each of the subbands at splitting level 4 as the highest layer, two lines of coefficient data of the subband 3LL are necessary.

To obtain two lines of the subband 3LL, that is, to obtain two lines of coefficient data of each of the subbands at splitting level 3, four lines of coefficient data of the subband 2LL are necessary.

To obtain four lines of the subband 2LL, that is, to obtain four lines of coefficient data of each of the subbands at splitting level 2, eight lines of coefficient data of the subband 1LL are necessary.

To obtain eight lines of the subband 1LL, that is, to obtain eight lines of coefficient data of each of the subbands at splitting level 1, 16 lines of coefficient data of the baseband are necessary.

That is, to obtain one line of coefficient data of each of the subbands at splitting level 4, 16 lines of image data of the baseband are necessary.

The number of lines of image data necessary for generating one line of coefficient data of the subband of the lowest frequency components (4LL in the case of FIG. 3) will be referred to as line block (or precinct).

For example, when the number of splitting levels is M, to generate one line of coefficient data of the subband of the lowest frequency components, the number of lines of image data of the baseband equal to the M-th power of 2 are necessary. This is the number of lines of a line block.

It should be noted that a line block also indicates a set of coefficient data of individual subbands obtained by wavelet transform of the one line block of image data.

Also, a line indicates a row of pixels in the horizontal direction of one row's worth of frame image (picture), or a row of coefficients in the horizontal direction of one row's worth of subband. This one line of coefficient data will be also referred to as coefficient line. Also, one line of image data will be also referred to as image line. In the following, these expressions will be changed as appropriate in cases where a more detailed differentiation is necessary.

Also, one line of encoded data obtained by encoding one coefficient line (one line of coefficient data) will be also referred to as encoded line.

According to the line-based wavelet transform process mentioned above, like tiling in JPEG2000, it is possible to decompose a single picture to a finer granularity for processing, thereby reducing delay at the time of transmitting and receiving image data. Further, in the case of a line-based wavelet transform, unlike tiling in JPEG2000, instead of splitting a single baseband signal, splitting using wavelet coefficients is performed. Hence, a line-based wavelet transform also has a characteristic that block noise-like image quality degradation does not occur at tile boundaries.

The foregoing description is directed to the line-based wavelet transform as an example of a line-based codec. It should be noted that embodiments of the present invention described below can be applied to not only a line-based wavelet transform but also an arbitrary line-based codec, for example, an existing layered encoding such as JPEG2000 or MPEG4.

First Embodiment

Figure 4:
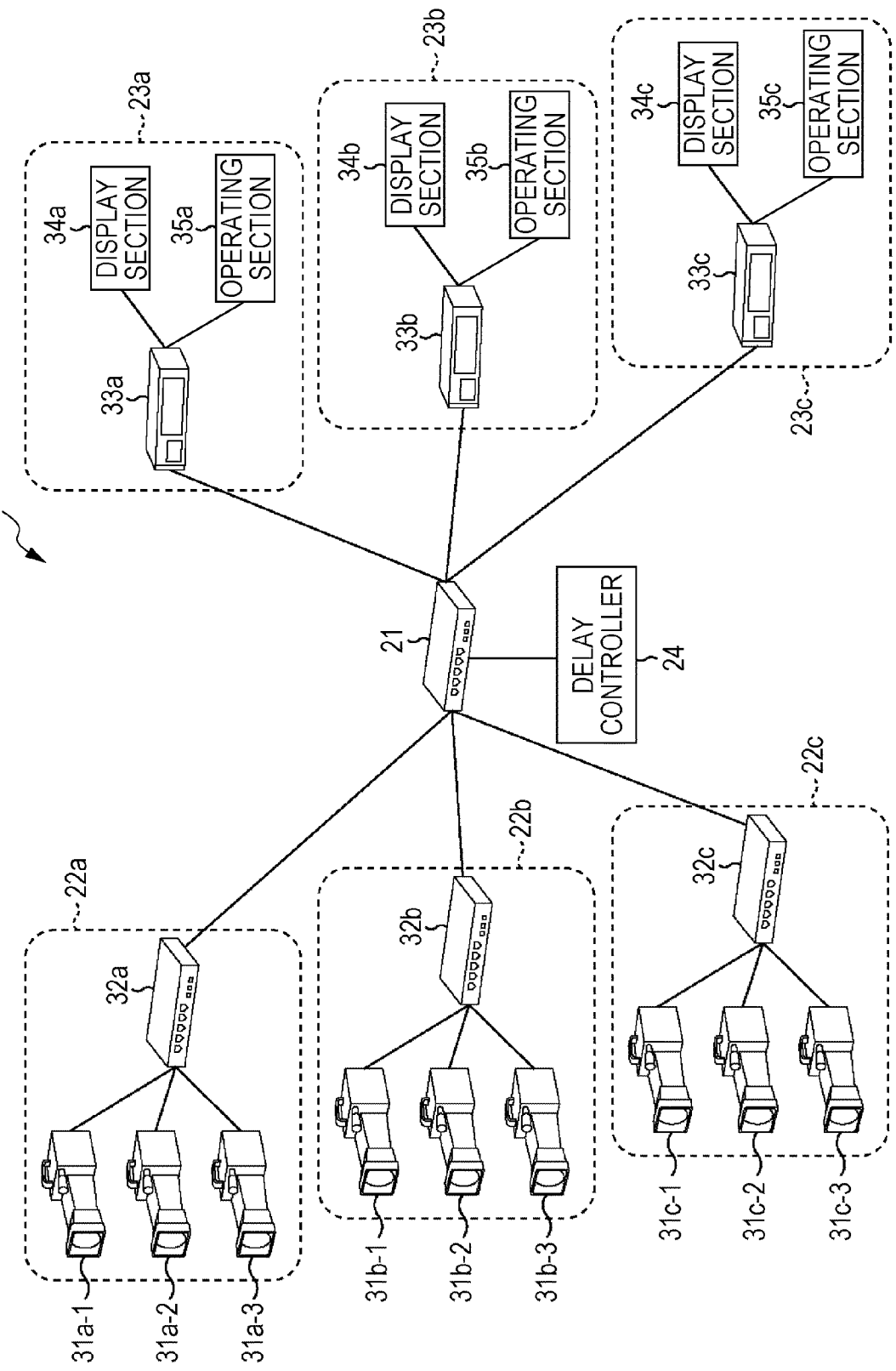
FIG. 4 is a block diagram showing an example of the configuration of a communication system according to a first embodiment of the present invention.

FIG. 4 is a block diagram showing an example of the configuration of a communication system according to a first embodiment of the present invention.

In FIG. 4, a communication system 20 includes a line switching device 21, three studios 22a to 22c, three sub-control rooms (hereinafter referred to as subs) 23a to 23c, and a delay controller 24. For example, in the communication system 20, individual devices are connected by general-purpose lines such as the Ethernet (registered trademark), NGN, and wireless.

The line switching device 21 is a device that relays communication among a plurality of devices that make up the communication system 20 and is, for example, a hub in the Ethernet (registered trademark). It should be noted that a hub is defined as the generic term for a line concentrator used in a star network, and may or may not have an SNMP (Simple Network Management Protocol) function. That is, the studios 22a to 22c, the subs 23a to 23c, and the delay controller 24 which make up the communication system 20 are connected to the line switching device 21, and communication therebetween is done via the line switching device 21.

The studios 22a to 22c are places where images are captured for generating image data, and each include a plurality of cameras, and a single line switching device.

The studio 22a includes cameras 31a-1 to 31a-3 and a line switching device 32a. The cameras 31a-1 to 31a-3 are connected to the line switching device 32a, and the line switching device 32a is connected to the line switching device 21. Like the studio 22a, the studio 22b includes cameras 31b-1 to 31b-3 and a line switching device 32b, and the studio 22c includes cameras 31c-1 to 31c-3 and a line switching device 32c.

The subs 23a to 23c are places where the studios 22a to 22c are selected, and the cameras 31a-1 to 31c-3 respectively provided in the studios 22a to 22c are controlled to relay image data. It should be noted that this embodiment assumes an environment in which the subs 23a to 23c are not in synchronism with each other due to the relation between pieces of equipment included in the respective subs.

The sub 23a includes a camera control unit (CCU) 33a, a display section 34a, and an operating section 35a. The display section 34a and the operating section 35a are connected to the CCU 33a, and the CCU 33a is connected to the line switching device 21. The display section 34a is formed by, for example, an LCD (Liquid Crystal Display), a CRT (Cathode Ray Tube), or the like, and displays images or the like captured by the cameras 31a-1 to 31c-3. The operating section 35a is formed by a plurality of switches, levers, or the like with which, for example, the user makes an operation of selecting the studios 22a to 22c or the cameras 31a-1 to 31c-3, and switching images.

Like the sub 23a, the sub 23b includes a CCU 33b, a display section 34b, and an operating section 35b, and the sub 23c includes a CCU 33c, a display section 34c, and an operating section 35c.

The delay controller 24 is a device that performs arbitration among the subs 23a to 23c, and determines a master timing. It should be noted that the configuration of the delay controller 24 will be described later with reference to FIG. 12.

In the communication system 20 configured in this way, for example, to acquire synchronization between the camera 31a-1 in the studio 22a, and the CCU 33a in the sub 23a, after the beginning of a picture is recognized, decoding in units of lines (or line blocks) within the picture is started from a predetermined decoding start time point. That is, the time point of start of decoding in lines (or line blocks) depends on when a transmitting process on the transmitting side (camera 31a-1 side) is started. At this time, no problem arises if the transmitter and the receiver are in a one-to-one relation. However, if there are a plurality of transmitters with respect to a receiver (CCU 33a), a situation can occur in which when managing or combining a plurality of pieces of image data on the receiving side, synchronization is not established among the pieces of image data. A method for overcoming such a situation in which synchronization is not established among pieces of image data has been proposed by the present applicant in Japanese Unexamined Patent Application Publication No. 2009-278545 described above.

The present invention proposes, in addition to such a proposal, a method that can achieve synchronization between pieces of image data for all of sets (combinations of cameras and CCUs), even in an environment where a plurality of subs are not in synchronism with each other due to the relation between pieces of equipment that exist within the respective subs.

First, a communication process performed between individual cameras and CCUs in the communication system 20 will be described, with the case of two cameras 31a-1 and 31a-2, and a single CCU 33a as an example.

The cameras 31a-1 and 31a-2 are each a transmitter that shoots a subject, generates a series of image data, and transmits the series of image data to the CCU 33a. While FIG. 4 shows video cameras as an example of the cameras 31a-1 and 31a-2, the cameras 31a-1 and 31a-2 are not limited to video cameras. For example, the cameras 31a-1 and 31a-2 may be digital still cameras with a moving image shooting function, PCs, mobile phones, or game machines.

The CCU 33a is a device acting as a master that determines the transmit/receive timing of image data in the communication system 20. While FIG. 4 shows a video processor for commercial use as an example of the CCU 33a, the CCU 33a is not limited to a video processor for commercial use. For example, the CCU 33a may be a personal computer, a video processor for home use such as a video recorder, a communication device, or an arbitrary information processor.

While in FIG. 4 connection between the CCU 33a and the cameras 31a-1 and 31a-2 is made by wired communication via the line switching device 21, the connection may be made by, for example, radio communication based on a standard specification such as IEEE 802.11a, b, g, n, s.

Next, referring to FIGS. 5 to 8, transmission and reception of image data between the CCU 33a and the camera 31a-1 will be described. It should be noted that transmission and reception of image data between the CCU 33a and the camera 31a-2 is also performed in the same manner as described below.

Figure 5:
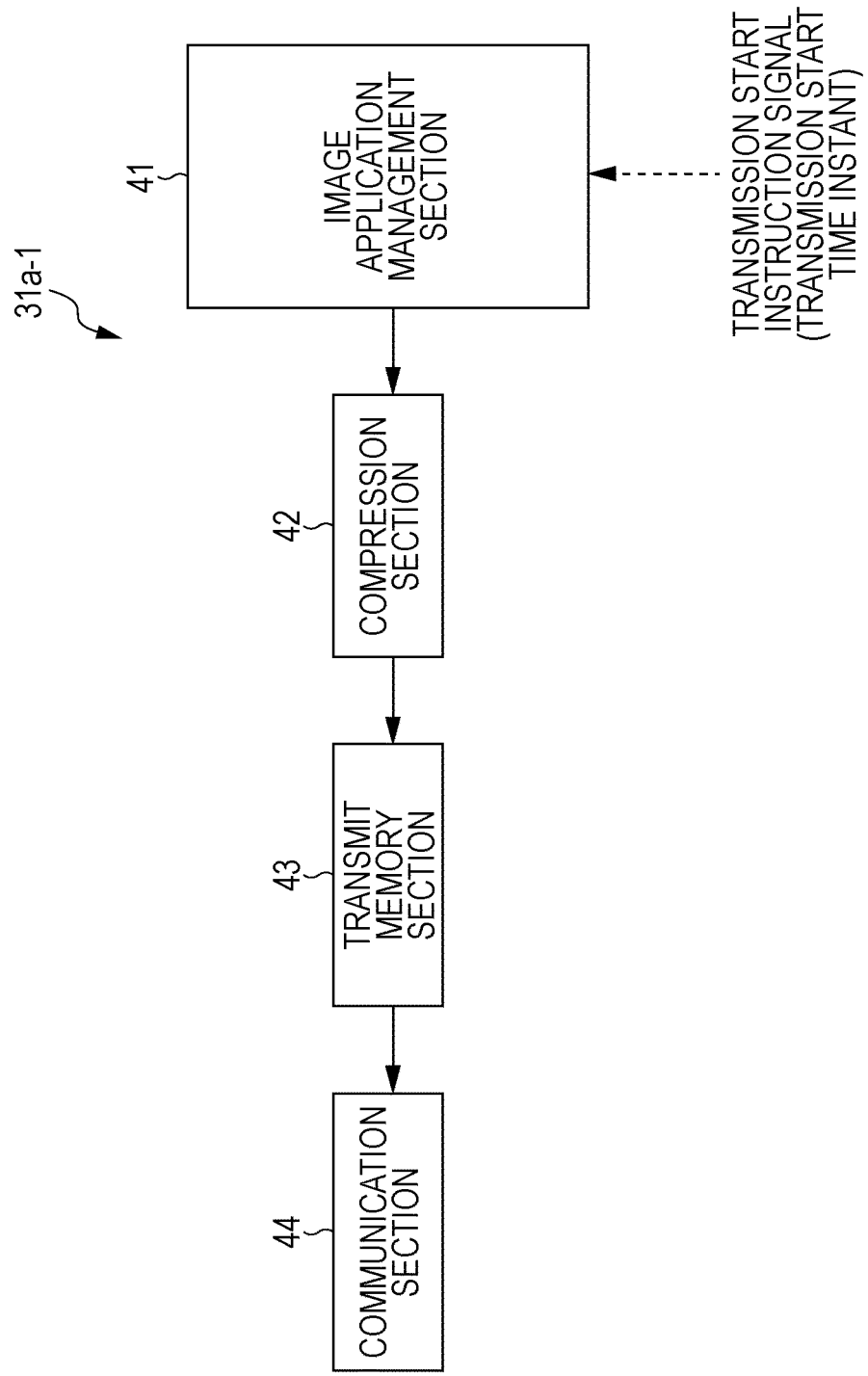
FIG. 5 is a diagram illustrating transmission and reception of image data between a CCU and a camera.

FIG. 5 is a block diagram showing the configuration of the camera 31a-1. As shown in FIG. 5, the camera 31a-1 includes the image application management section 41, a compression section 42, a transmit memory 43, and a communication section 44.

The image application management section 41 accepts from an application a transmission request for image data captured by an image input device (such as a CCD (Charge Coupled Device) or CMOS (Complementary Metal Oxide Semiconductor) sensor) provided in the camera 31a-1, performs routing control and QoS-based control related to wireless lines, and also adjusts the transmit timing of image data with respect to the CCU 33a. More specifically, the image application management section 41 receives a transmission start instruction signal transmitted from a synchronization control section 57 (FIG. 6) of the CCU 33a described later, and outputs image data to the compression section 42 at a specified transmission start time instant. Also, processing in the image application management section 41 may include control of the image input device.

The compression section 42, the transmit memory section 43, and the communication section 44 execute a series of image data transmitting processes in the encoding units described above in association with this embodiment, with respect to the image data supplied from the image application management section 41 at the transmission start time instant.

Figure 6:
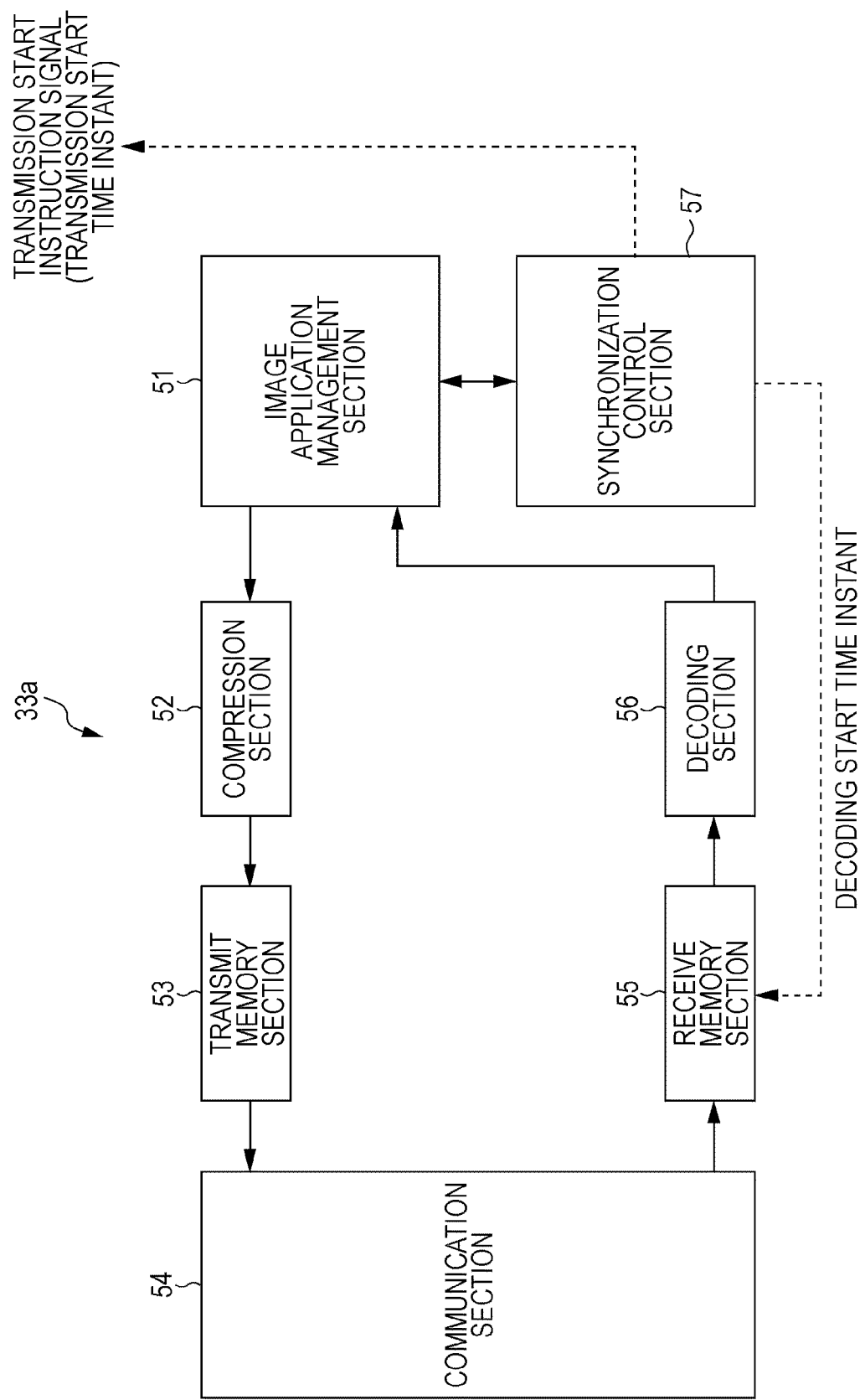
FIG. 6 is a block diagram showing the configuration of a CCU.

FIG. 6 is a block diagram showing the configuration of the CCU 33a. Referring to FIG. 6, the CCU 33a includes an image application management section 51, a compression section 52, a transmit memory section 53, a communication section 54, a receive memory section 55, a decoding section 56, and the synchronization control section 57.

The image application management section 51 accepts a transmission request for captured image data from an application, and performs routing control and QoS-based control related to wireless lines, or management of input/output of image data with respect to the application.

The compression section 52 encodes image data supplied from the image application management section 51 in encoding units of N lines (N is not smaller than 1) in one field to reduce the amount of data, and then outputs the encoded data to the transmit memory section 53.

The transmit memory section 53 temporarily accumulates the data received from the compression section 52. Also, the transmit memory section 53 may have a routing function of managing routing information in according with the network environment, and controlling transfer of data to another terminal. It should be noted that the receive memory section 55 and the transmit memory section 53 may be combined to perform accumulation of transmit data and receive data.

The communication section 54 executes processes such as reception of the series of image data in the encoding units described above, which is transmitted from the communication section 44 of the camera 31a-1, and transmission of transmit data accumulated in the transmit memory section 53.

For example, the communication section 54 reads out data accumulated in the transmit memory section 53, generates transmit packets (for example, IP packets in the case of performing communication based on the IP protocol), and transmits the transmit packets. Also, for example, when communication packets are received, the communication section 54 analyzes the received packets, separates image data and control data that should be passed on to the image application management section 51, and outputs the separated image data and control data to the receive memory section 55. For example, in the case of performing communication based on the IP protocol, the communication section 54 can reference destination IP addresses and destination port addresses included in the received packets, and outputs image data and the like to the receive memory section 55. It should be noted that the communication section 54 may have a routing function of controlling data transfer to another terminal.

The receive memory section 55 temporarily accumulates the data outputted from the communication section 54, and judges the time point at which to start decoding and outputs the data to be decoded to the decoding section 56. For example, the receive memory section 55 determines a decoding start time instant acquired from the synchronization control section 57 as the decoding start time point for image data.

The decoding section 56 decodes the data outputted from the receive memory section 55 in units of N lines (N is not smaller than 1) in one field, and then outputs the decoded data to the image application management section 51.

The synchronization control section 57 acts as a timing controller that controls the transmit/receive timing of image data between devices within the communication system 20. Like the image application management section 51, the synchronization control section 57 is typically implemented as processing in the application layer.

Adjustment of the transmit/receive timing of image data by the synchronization control section 57 is started with an instruction from the image application management section 51, reception of a synchronization request signal from the camera 31a-1, or the like as a trigger. Then, the synchronization control section 57 transmits to the camera 31a-1a transmission start instruction signal that specifies a transmission start time instant for the image data, and specifies a decoding start time instant with respect to the receive memory section 55.

At this time, the transmission start time instant for the image data transmitted to the camera 31a-1 is a time instant obtained by subtracting the time necessary for absorbing a delay such as a delay caused by fluctuations in the amount of data in each encoding unit or fluctuations in communication environment such as jitters of communication paths, a hardware delay, or a memory delay, from the decoding start time instant specified with respect to the receive memory section 55.

In should be noted that in FIGS. 5 and 6, for ease of understanding of the explanation, the transmission start instruction signal is depicted as being directly exchanged between the image application management section 41 and the synchronization control section 57. In actuality, however, the transmission start instruction signal is transmitted and received via the communication sections 44 and 54.

Next, the flow of an image data transmitting process by the camera 31a-1, and a receiving process by the CCU 33a will be described with reference to FIGS. 7 and 8.

Figure 7:
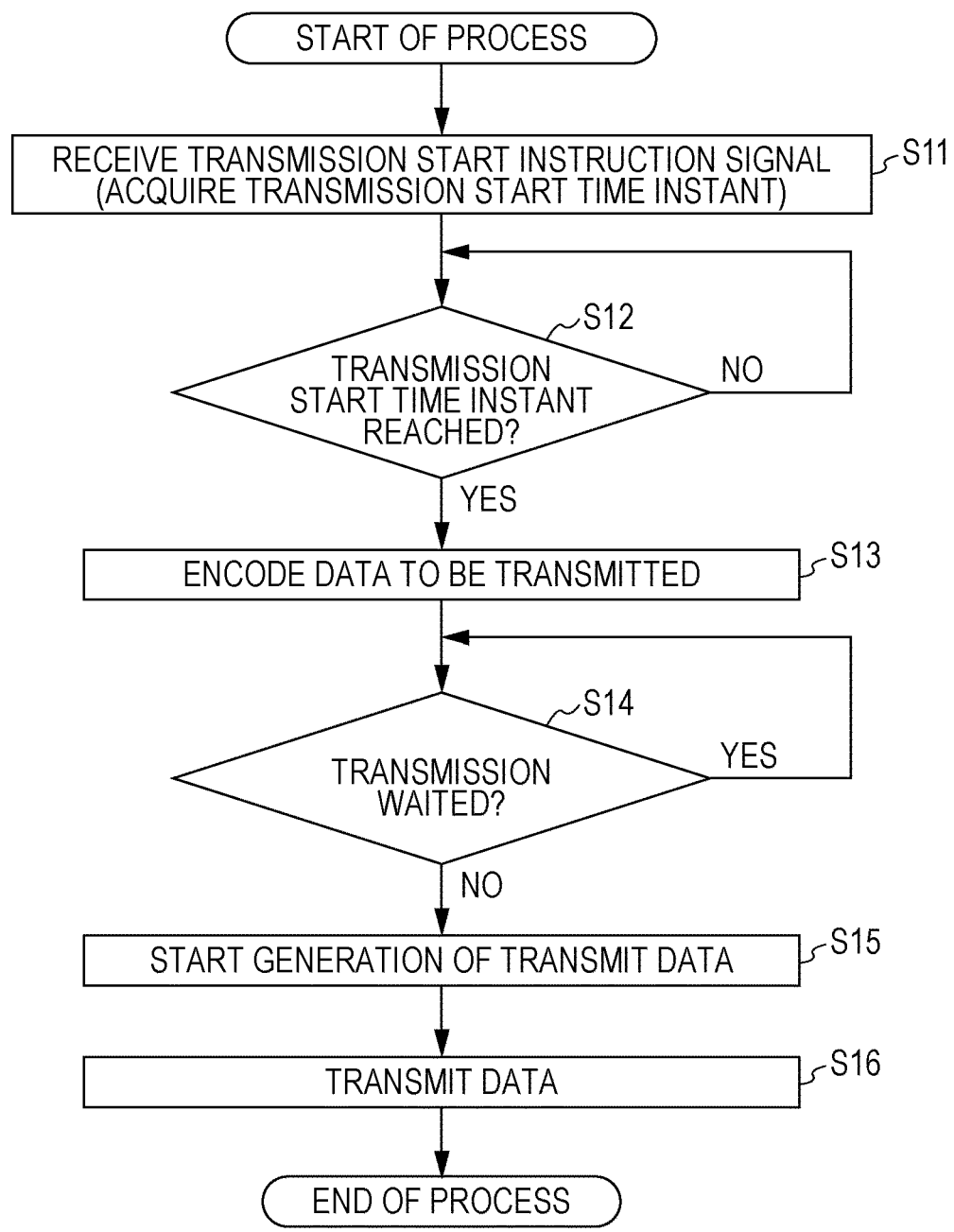
FIG. 7 is a flowchart showing the flow of an image data transmitting process in a camera.

FIG. 7 is a flowchart showing the flow of an image data transmitting process in the camera 31a-1.

Referring to FIG. 7, first, a transmission start instruction signal transmitted from the CCU 33a is received by the image application management section 41 (step S11). The image application management section 41 acquires the transmission start time instant included in the transmission start instruction signal.

Then, the image application management section 41 waits until the transmission start time instant is reached (step S12), and when the transmission start time instant is reached, the image application management section 41 outputs image data to the compression section 42. The compression section 42 encodes the outputted image data in encoding units of N lines (N is not smaller than 1) in one field, and outputs the encoded data to the transmit memory section 43 (step S13). Thereafter, the image data is accumulated in the transmit memory section 43, depending on the communication path and the status of progress of the transmitting process (step S14).

Thereafter, when the transmit timing is reached, the image data is outputted from the transmit memory section 43 to the communication section 44, and generation of communication data including the image data is started (step S15). Then, the communication data is transmitted to the CCU 33a (step S16).

Figure 8:
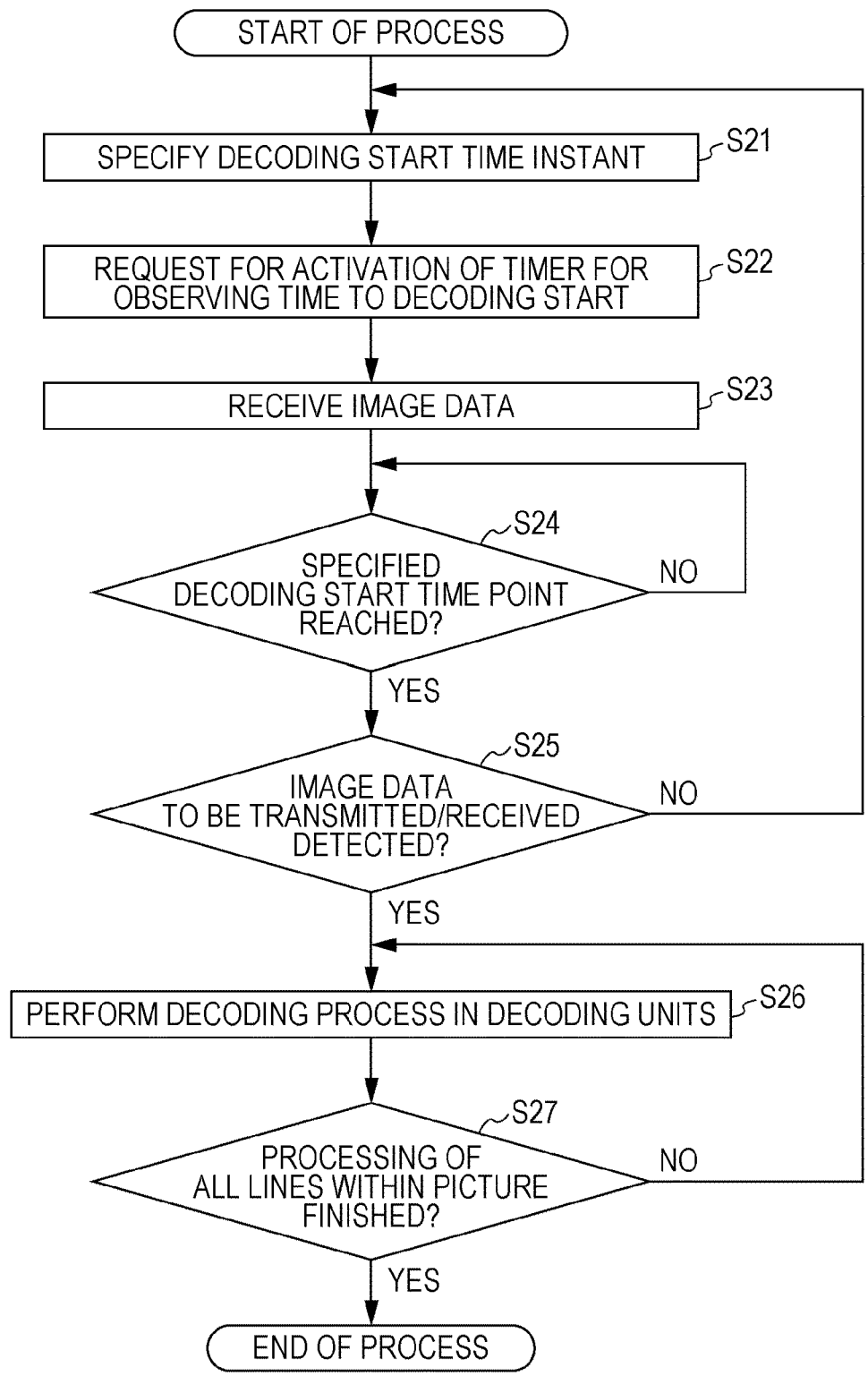
FIG. 8 is a flowchart showing the flow of an image data receiving process in a CCU.

FIG. 8 is a flowchart showing the flow of an image data receiving process in the CCU 33a.

Referring to FIG. 8, first, the synchronization control section 57 specifies a decoding start time instant with respect to the receive memory section 55 (step S21). The specifying of a decoding start time instant at this time can be done by, for example, writing the decoding start time instant to a predetermined address in the storage section, or outputting a signal to the receive memory section 55. Also, at this time, a transmission start instruction signal is also transmitted from the synchronization control section 57 to the camera 31a-1.

Thereafter, in the receive memory section 55, activation of a timer for observing the time to the decoding start time instant is requested (step S22).

Further, image data received from the camera 31a-1 via the communication section 54 is sequentially passed on to the receive memory section 55 (step S23). The image data passed on at this time is accumulated until the decoding start time instant.

Then, when the decoding start time instant specified in step S21 is reached (step S24), it is judged whether or not reception of image data to be transmitted/received has been completed at that point in time (step S25). At this time, if it is not possible to detect image data to be transmitted/received, the processing returns to step S21, and the transmit/receive timing of the image data is readjusted.

On the other hand, if image data to be transmitted/received is detected in step S25, the image data is subjected to a decoding process in decoding units (step S26).

Then, the decoding process in decoding units is repeated until processing of all of lines within the picture is finished (step S27), and the receiving process ends at the time when processing of all the lines is finished.

In the foregoing, with reference to FIGS. 5 to 8, a description has been given of an overview of operation for acquiring synchronization between the studio 22a and the sub 23a constituting a part of the first embodiment of the present invention. In this embodiment, the CCU 33a includes the synchronization control section 57 that transmits a signal for specifying a transmission start time instant for image data to the cameras 31a-1 and 31a-2.

According to this configuration, in the case where a plurality of transmitters exist with respect to a receiver, when managing or combining a plurality of pieces of image data on the receiving side, the CCU 33a acts as a timing controller, making it possible to achieve synchronization between the pieces of image data.

Also, the synchronization control section 57 specifies, with respect to a decoding start instruction section within the receive memory section 55, a decoding start time instant that is separated from the above-described transmission start time instant by a time interval necessary for absorbing fluctuations in communication environment. Then, the decoding start instruction section within the receive memory section 55 determines a decoding start time point on the basis of the specified decoding start time instant, and instructs starting of decoding of image data in decoding units. Accordingly, image data transmitted while maintaining synchronization between transmitters can be decoded in a stable, synchronized state while absorbing the influence of fluctuations in communication environment, or the like.

For example, in order for the CCU 33a to achieve synchronization between the cameras 31a-1 and 31a-2, a frame synchronization time stamp inserted by the synchronization control section 57 is used for the communication data transmitted and received between the CCU 33a and the cameras 31a-1 and 31a-2.

Referring to FIGS. 9A to 9D, a description will be given of the frame format of an IP packet, which is an example of communication data that can be transmitted and received between the CCU 33a and the camera 31a-2.

Figure 9:
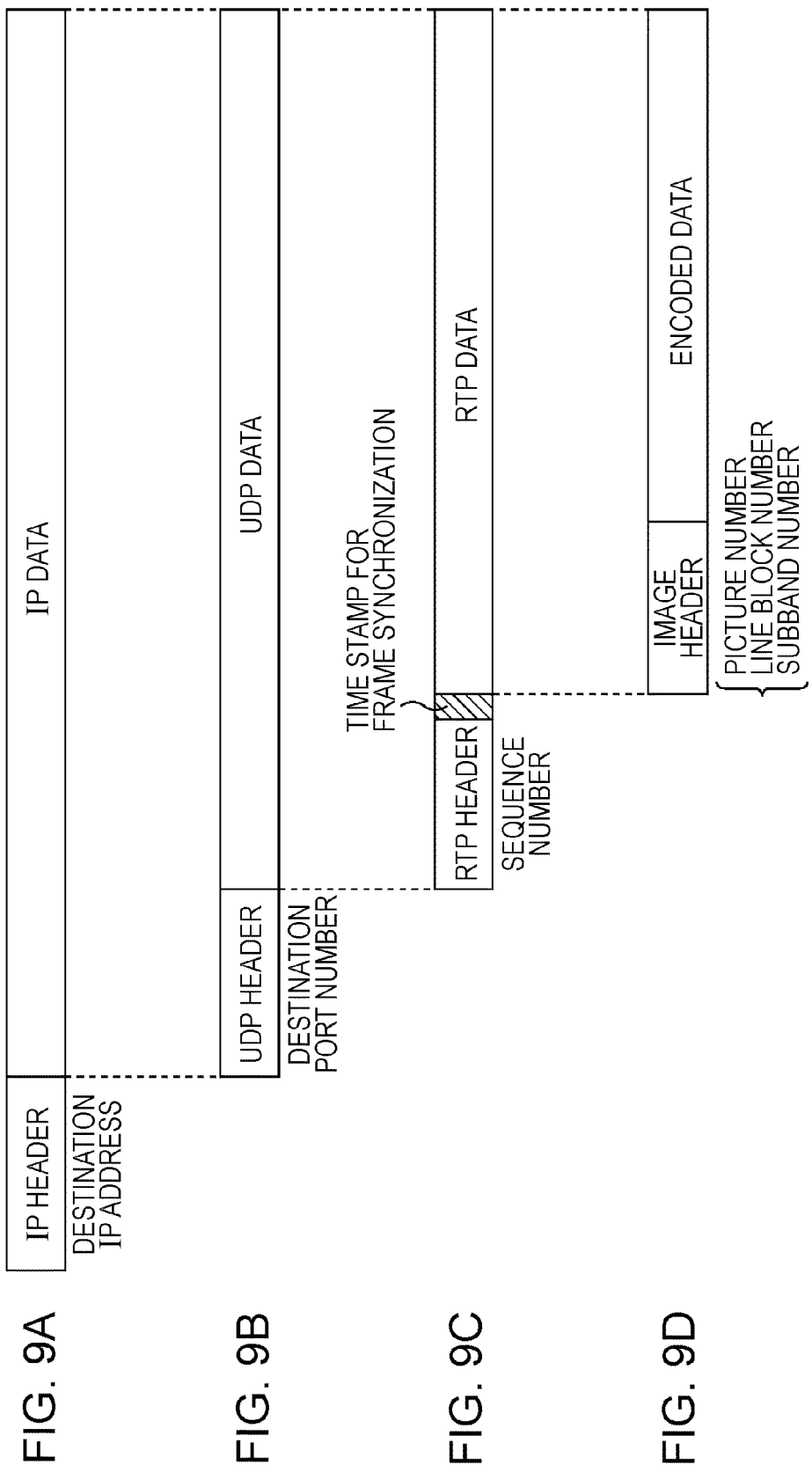
FIGS. 9A to 9D are diagrams illustrating the frame format of an IP packet.

FIGS. 9A to 9D show the internal structure of a single IP packet in four stages of A to D. Referring to FIG. 9A, the IP packet is made up of an IP header and IP data. The IP header contains, for example, control information related to control of communication paths based on the IP protocol, such as a destination IP address.

The IP data is further made up of a UDP header and UDP data (FIG. 9B). The UDP is a protocol at the transport layer of the OSI reference model, which is generally used for applications such as delivery of moving image or audio data for which real-timeness is regarded as important. The UDP header contains, for example, a destination port number, which is application identification information.

The UDP data is further made up of an RTP header and RTP data (FIG. 9C). The RTP header contains, for example, control information for ensuring real-timeness of a data stream such as a sequence number. Also, this control information contains a frame synchronization time stamp, which is generated by the synchronization control section 57 to achieve synchronization between a plurality of cameras.

In this embodiment, the RTP data is made up of a header of image data (hereinafter, referred to as image header), and encoded data that is the main body of an image compressed on the basis of a line-based codec (FIG. 9D). The image header can contain, for example, a picture number, a line block number (or a line number in the case when encoding is done in one-line units), or a subband number. It should be noted that the image header may be further separated into a picture header that is given for each picture, and a line block header that is given for each line block.

When a frame synchronization time stamp generated by the synchronization control section 57 is contained in an IP packet in this way, a single CCU can establish synchronization of a plurality of cameras.

Incidentally, in a communication system having a plurality of CCUs and a plurality of cameras, that is, the communication system 20 having the CCUs 33a to 33c and the cameras 31a-1 to 31c-3 as shown in FIG. 4, when the CCUs 33a to 33c are not in synchronism with each other, processing is performed at different timings in the respective synchronization control sections 57 of the CCUs 33a to 33c. In the case where CCUs are out of synchronism with each other as described above, processing is performed at different timings when switching subs, which can sometimes cause disturbances in the image.

For example, referring to FIG. 10, asynchronism between CCUs will be described.

Figure 10:
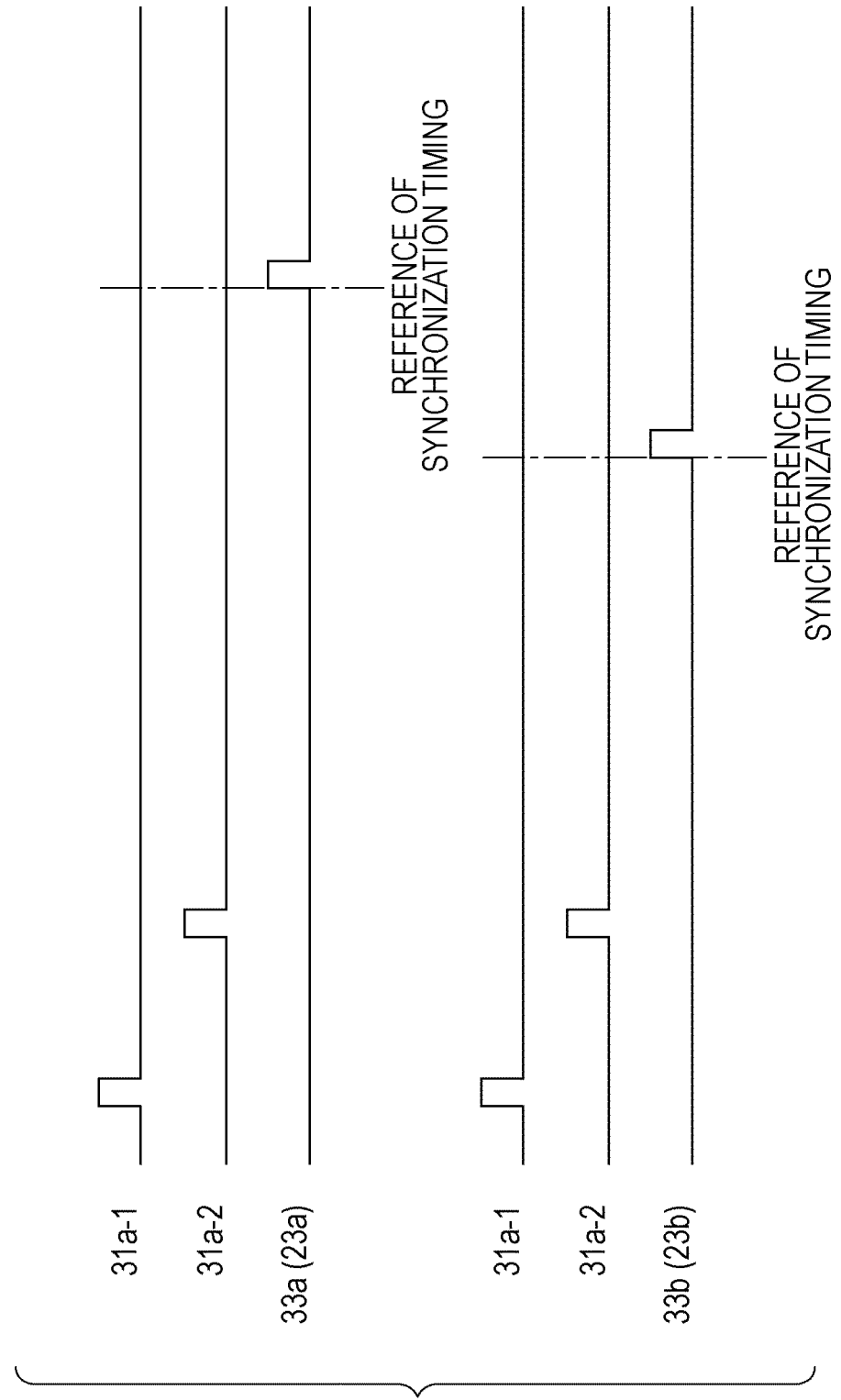
FIG. 10 is a diagram illustrating asynchronism between CCUs.

FIG. 10 illustrates asynchronism between the CCU 33a and the CCU 33b with reference to the cameras 31a-1 and 31a-2 of the studio 22a.

As shown in FIG. 10, in the state where the CCU 33a and the CCU 33b are out of synchronism with each other, when video data is switched from the sub 23a to the sub 23b, since images are not synchronized, it is necessary to operate the cameras 31a-1 and 31a-2 with reference to the sub 23a and then, after switching to the sub 23b, apply re-synchronization to the cameras 31a-1 and 31a-2 with reference to the sub 23b. Consequently, video is frequency disturbed in a video system that frequently switches between the sub 23a and the sub 23b, making such a video system unsuitable for use in live relay broadcasting.

Accordingly, as shown in FIG. 4, the delay controller 24 is introduced to the communication system 20, and the delay controller 24 performs a process of arbitrating between the sub 23a and the sub 23b, and determining a mater timing. It should be noted that in addition to being configured as a device connected to the line switching device 21, for example, the delay controller 24 may be implemented in the subs 23a to 23c.

Figure 11:
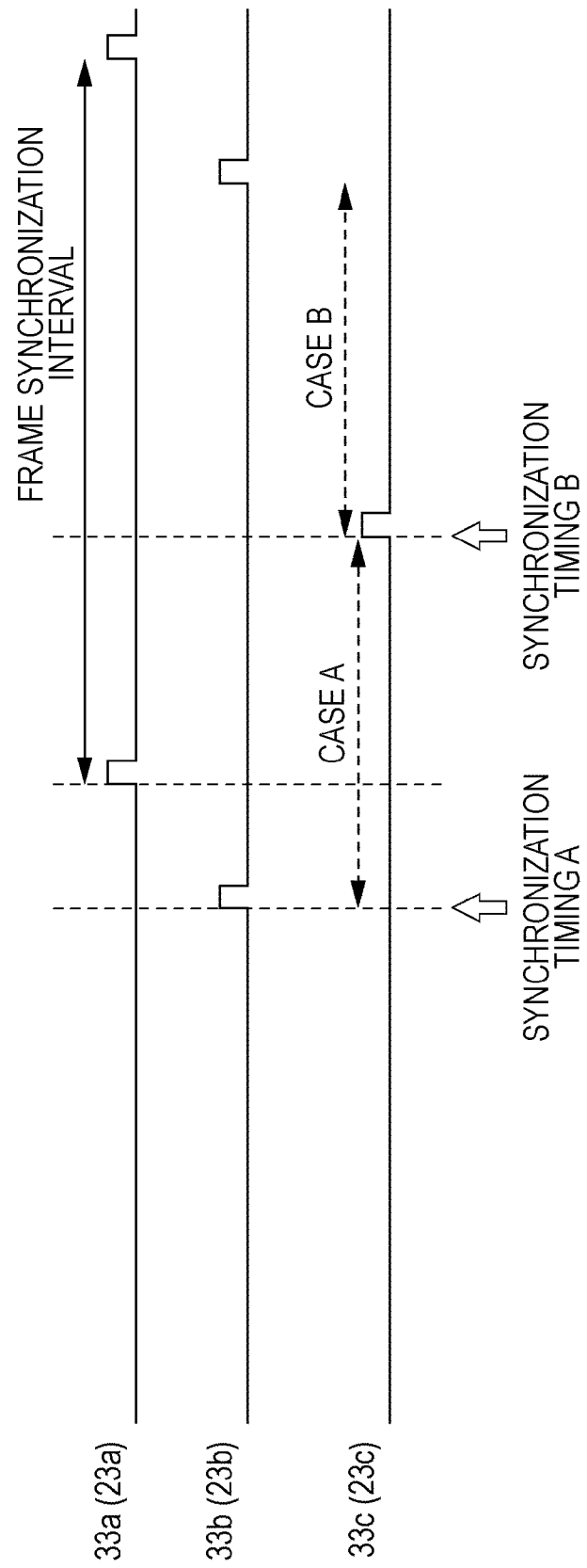
FIG. 11 is a diagram illustrating an overview of operation of a delay controller.

Referring to FIG. 11, an overview of operation of the delay controller 24 will be described. FIG. 11 shows an example of a process in which a master timing is determined for three subs 23a to 23c.

In an environment where three different frame synchronization timings exist, to set the frame synchronization timing of one sub as a master timing, the delay controller 24 prepares a buffer for delaying the video data of each of the other two subs, and finds one sub that makes the delay of each of these two subs as small as possible. At this time, it is supposed that the delay due to network connection from each sub to each studio is negligibly small. That is, as in the communication system 20 in FIG. 4, it is supposed that the subs 23a to 23c are linked to the line switching device 21 once, and are then connected to the studios 22a to 22c from the line switching device 21. Since the distance from the subs 23a to 23c to the studios 22a to 22c is constant, the master timing can be determined solely on the basis of the frame synchronization timings of the CCUs 33a to 33c respectively provided in the subs 23a to 23c.

For example, the delay controller 24 first compares the sub 23a with the sub 23b, and detects the sub that can make the amount of delay buffer of the other sub smaller. In the example in FIG. 11, the sub 23b can make the delay of the other sub smaller than the sub 23a.

Next, the delay controller 24 compares the sub 23b with the sub 23c. For the sub 23c, the delay time with respect to the sub 23b is either Case A or Case B. Accordingly, the delay controller 24 compares the time intervals of Case A and Case B with each other, judges the time interval of Case A as being shorter, and judges the sub 23b as a master. In the example in FIG. 11, since Synchronization Timing A is determined as the master timing, for the sub 23a, a buffer is prepared so as to allow a delay from Synchronization Timing A to the frame synchronization timing of the sub 23a, and for the sub 23c, a buffer is prepared so as to allow a delay from Synchronization Timing A to the frame synchronization timing of the sub 23c.

Since the frame synchronization timing of the sub 23b has become the master timing in this way, the sub 23a and the sub 23c are each caused to be delayed only by the difference from the sub 23b by the buffer (for example, the receive memory section 55 of the CCU 33a in FIG. 6 is used as the buffer).

Figure 12:
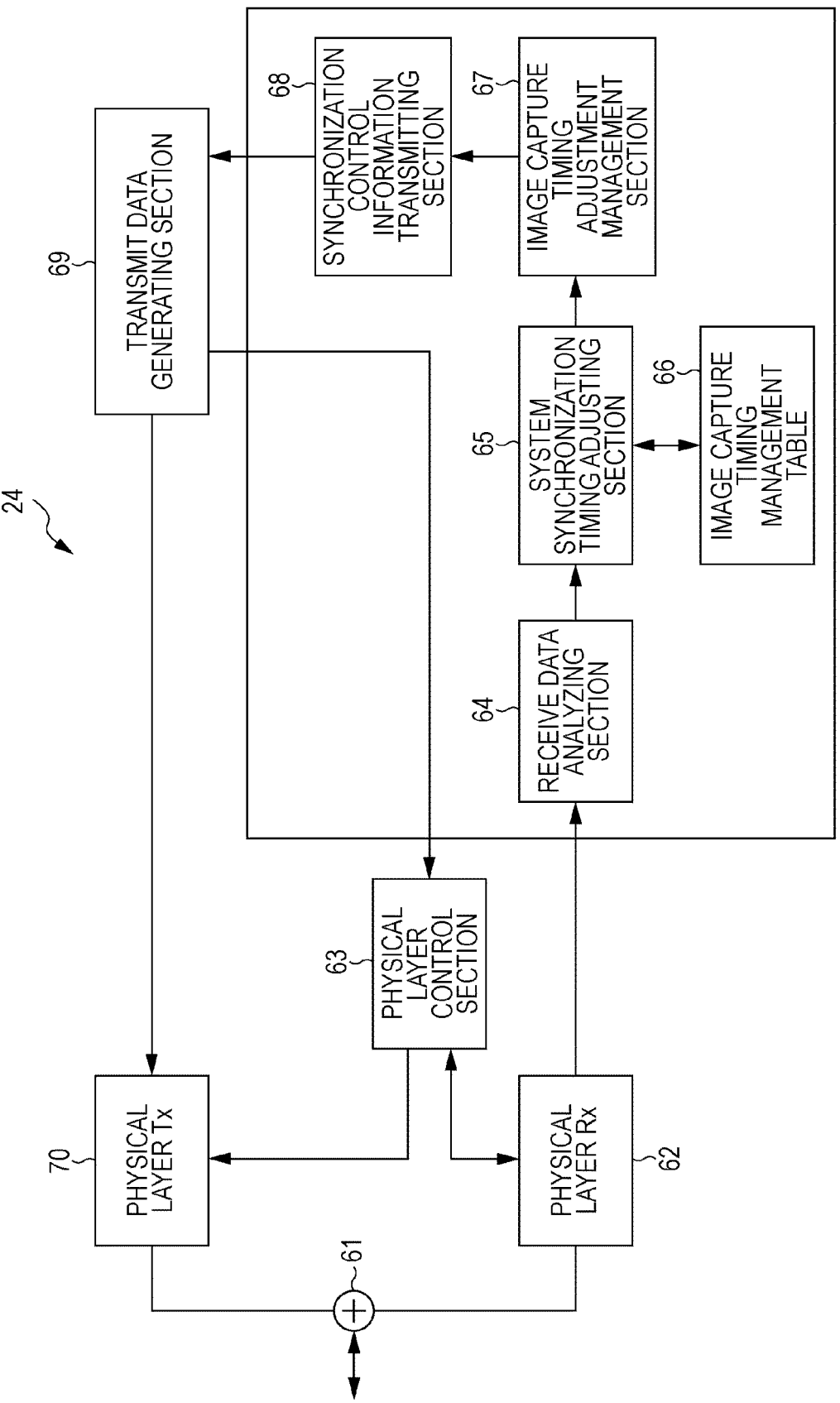
FIG. 12 is a block diagram showing an example of the configuration of the delay controller.

Next, FIG. 12 is a block diagram showing an example of the configuration of the delay controller 24.

As shown in FIG. 12, the delay controller 24 includes a switch section 61, a physical layer Rx 62, a physical layer control section 63, a receive data analyzing section 64, a system synchronization timing adjusting section 65, an image capture timing management table 66, an image capture timing adjustment management section 67, a synchronization control information transmitting section 68, a transmit data generating section 69, and a physical layer Tx 70.

The switch section 61 has a function of switching between transmission and reception of data, and is connected to the line to the line switching device 21 (FIG. 4).

The physical layer Rx 62 is a physical layer receiving section that receives packets from a line. The physical layer Rx 62 receives packets from a digital network line such as the Ethernet (registered trademark) or NGN, or a wireless line. For example, the physical layer Rx 62 starts operation on the basis of a request from the physical layer control section 63, and supplies received packets to the receive data analyzing section 64.

The physical layer control section 63 is a physical layer control section that detects received packets, and starts a receiving operation. Also, for example, the physical layer control section 63 controls the physical layer on the basis of control from the transmit data generating section 69.

The receive data analyzing section 64 analyzes the kind of each received packet and, for example, judges that a packet describing the frame synchronization timing of each of the subs 23a to 23c has been received.

The system synchronization timing adjusting section 65 performs a process of adjusting synchronization timing on the basis of the packet discriminated in the receive data analyzing section 64, while exchanging data with the image capture timing management table 66. That is, the system synchronization timing adjusting section 65 determines a master timing in the manner as described above with reference to FIG. 11.

The image capture timing management table 66 is used to manage (store) frame synchronization timings of the subs 23a to 23c, and delays from the subs 23a to 23c to the cameras 31a-1 to 31c-3 of the studios 22a to 22c, from the system synchronization timing adjusting section 65. Those pieces of information are referenced when the system synchronization timing adjusting section 65 determines a master timing.

The image capture timing adjustment management section 67 manages transmission of frame synchronization information to the cameras 31a-1 to 31c-3 of the studios 22a to 22c, so that video data can be received at the master timing determined by the system synchronization timing adjusting section 65.

The synchronization control information transmitting section 68 controls transmission of synchronization information, on the basis of a start timing received from the image capture timing adjustment management section 67.

The transmit data generating section 69 generates, on a packet-by-packet basis, a packet adapted to the line of the physical layer Tx 70.

The physical layer Tx 70 is a physical layer transmitting section that transmits packets to a line. The physical layer Tx 70 transmits packets to a digital network line such as the Ethernet (registered trademark) or NGN, or a wireless line. For example, the physical layer Tx 70 starts operation on the basis of a request from the physical layer control section 63, and supplies communication packets supplied from the transmit data generating section 69 to the switch section 61.

While in this embodiment the time intervals of Case A and Case B shown in FIG. 11 are judged in the delay controller 24 described above with reference to FIG. 5, this should not be construed restrictively. It is also possible to calculate Case A and Case B in the delay controller 24 and, for example, display Case A and Case B as delay information on the display section 34a of the sub 23a, thus allowing the user to make a selection by operating the operating section 35a by looking at the delay information.

Also, the delay controller 24 can be configured to include a buffer (for example, by providing a buffer between the physical layer Rx 62 and the physical layer Tx 70) for delaying data with respect to the subs 23a to 23c for synchronization to the master timing, and transmit data delayed by a predetermined timing to the network of the communication system 20. In addition to such a configuration, the CCUs 33a to 33c may be each configured to include a delay buffer, and receive delay designation information from the delay controller 24 to thereby control a delay.

It should be noted that in the case where the above-described line-based wavelet transform is to be used as a line-based codec commonly in this embodiment, communication packets can be generated not in line-block units but in units of subbands of line blocks. In that case, in the receive memory section, for example, a storage area corresponding to a line block number and a subband number acquired from the image header may be secured, and image data decomposed into frequency components may be accumulated in units of subbands of line blocks.

At this time, for example, in the case where loss of a subband (or part thereof) has occurred due to a transmission error or the like when performing decoding in line-block units, dummy data may be inserted after the corresponding subband in a line block, and normal decoding may be performed from the next line block.

Second Embodiment

Figure 13:
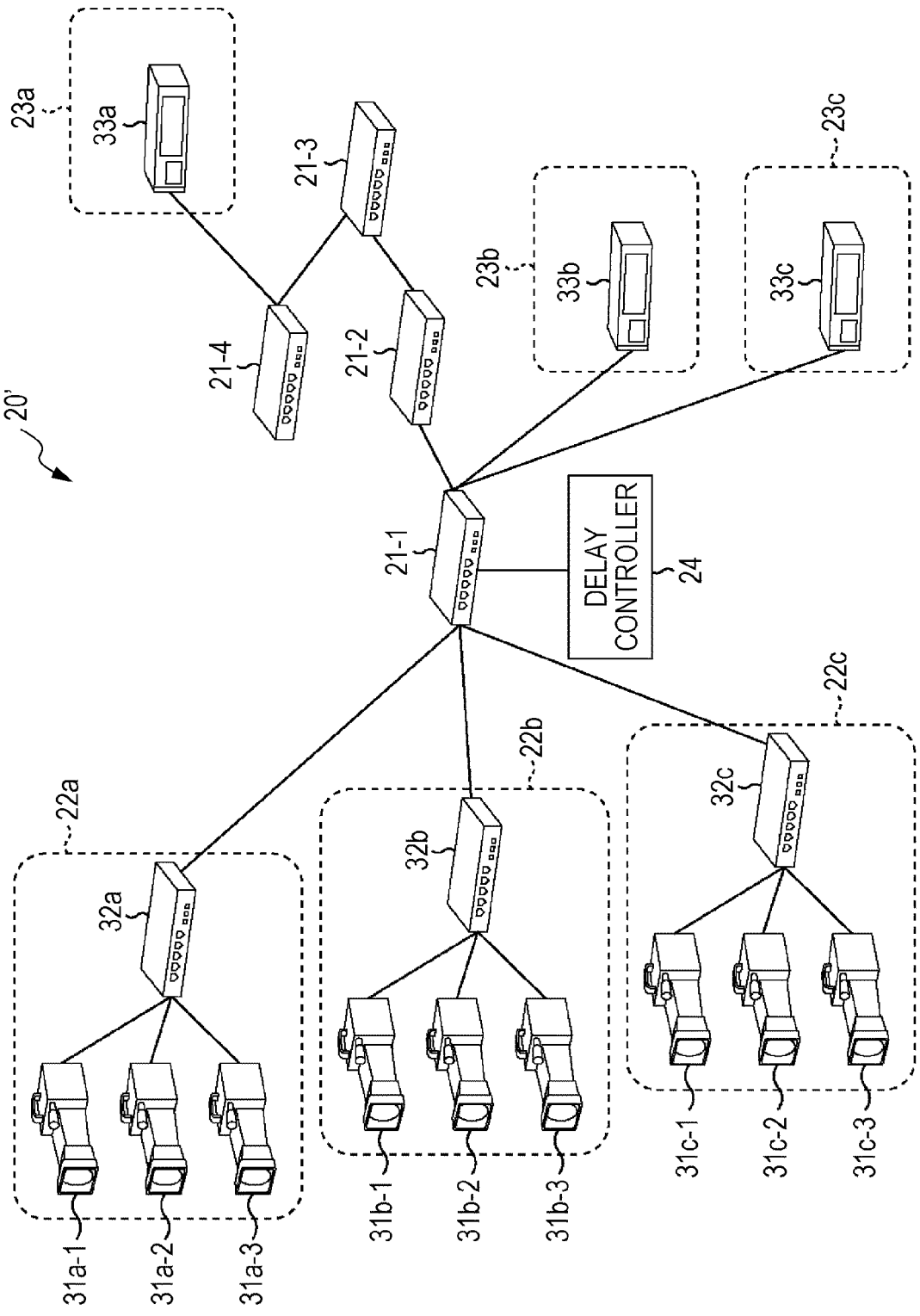
FIG. 13 is a block diagram showing an example of the configuration of a communication system according to a second embodiment of the present invention.

FIG. 13 is a block diagram showing an example of the configuration of a communication system according to a second embodiment of the present invention.

In the first embodiment described above, the description has been made on the assumption that the difference in delay due to network connection from the subs 23a to 23c to the studios 22a to 22c is negligibly small. However, in actuality, if their respective connection paths differ greatly, it is necessary to establish their synchronization while taking the difference in delay into consideration. Accordingly, in the second embodiment, a description will be given of a configuration in which the respective connection paths between the studios 22a to 22c and the subs 23a to 23c differ.

As shown in FIG. 13, in a communication system 20', the line connection configuration (network topology in the case of the Ethernet (registered trademark)) is changed in comparison to the communication system 20 in FIG. 4. That is, in the communication system 20', while the CCU 33b of the sub 23b and the CCU 33c of the sub 23c are connected directly to a line switching device 21-1, the CCU 33a of the sub 23a is connected to the line switching device 21-1 via line switching devices 21-2 to 21-4.

Such a configuration example of the communication system 20' will be described while focusing on the difference from the first embodiment, assuming that the misalignment of frame synchronization timing between the sub 23a and the sub 23b is the same as that described with reference to FIG. 4.

Figure 14:
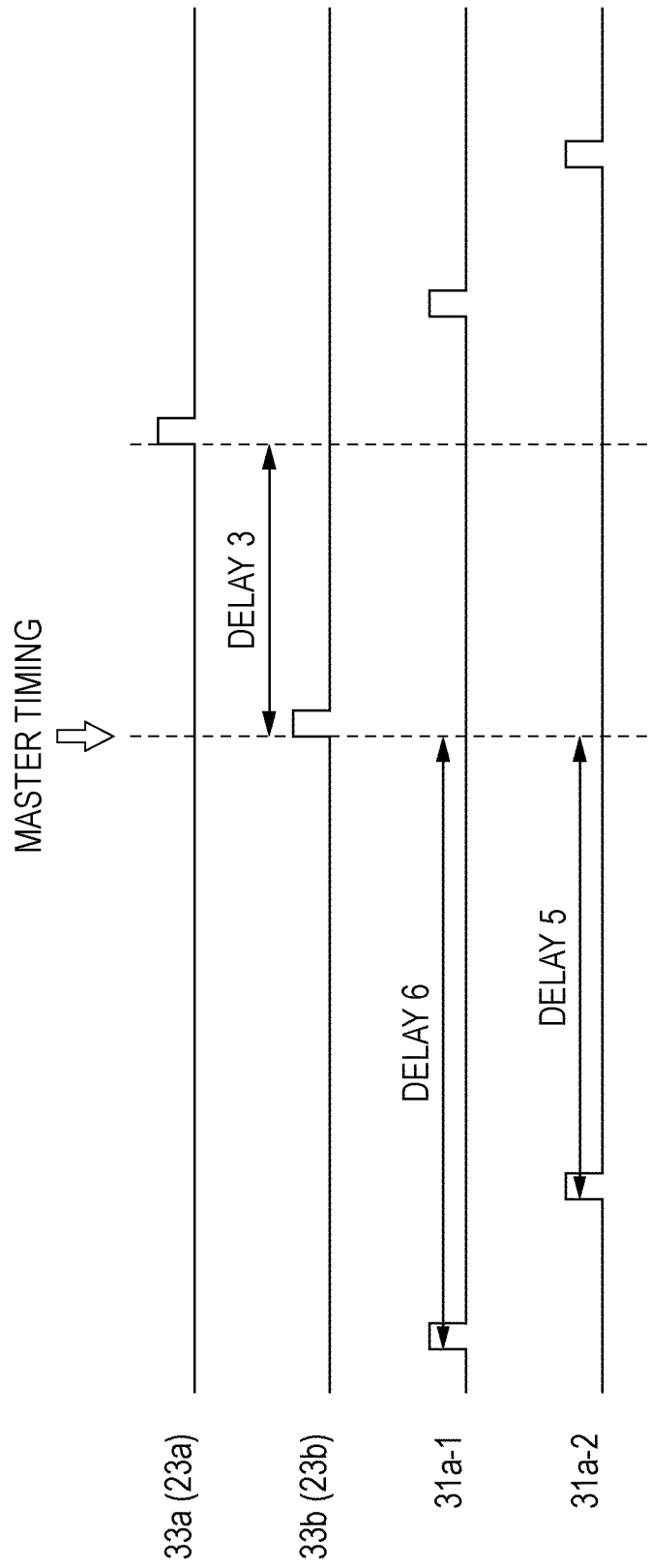
FIG. 14 is a diagram showing a system timing after acquisition of synchronization.

FIG. 14 is a diagram showing a system timing after acquisition of synchronization between the cameras 31a-1 and 31a-2 of the studio 22a, in the case when the sub 23b serves as a master timing. That is, in FIG. 14, the frame synchronization timings of the cameras 31a-1 and 31a-2 are generated with reference to the frame synchronization timing (=master timing) of the sub 23b.

First, in FIG. 14, the total delay of the communication system 20' as a whole is considered. Suppose that the delay from the master timing to the camera 31a-1 is 6 (the delay including jitter from the camera 31a-1 to the sub 23b). In this case, the frame synchronization timing of the camera 31a-1 is earlier in phase than the frame synchronization timing of the CCU 33b by a time interval equivalent to the delay time 6. Accordingly, in the camera 31a-1, the arrival time of packets at the CCU 33b is adjusted so that the packets can be handled at the frame synchronization timing of the CCU 33b.

On the other hand, suppose that the amount of delay from the master timing to the camera 31a-2 is 5 (the delay including jitter from the camera 31a-2 to the CCU 33b). Since the frame synchronization timing of the CCU 33a of the sub 23a is delayed by a delay 3 from that of the CCU 33b of the sub 23b, the total delay in the communication system 20' is 14 (a delay 6+a delay 5+a delay 3). It should be noted that in this embodiment, the unit of delay is not limited. Here, while the delay is described on the basis of a ratio, the delay may be also a time or clock unit.

As opposed to the case in which the sub 23b serves as the master timing as described above, the total delay in the communication system 20' when the master timing is set as the CCU 33a of the sub 23a will be described with reference to FIG. 15.

Figure 15:
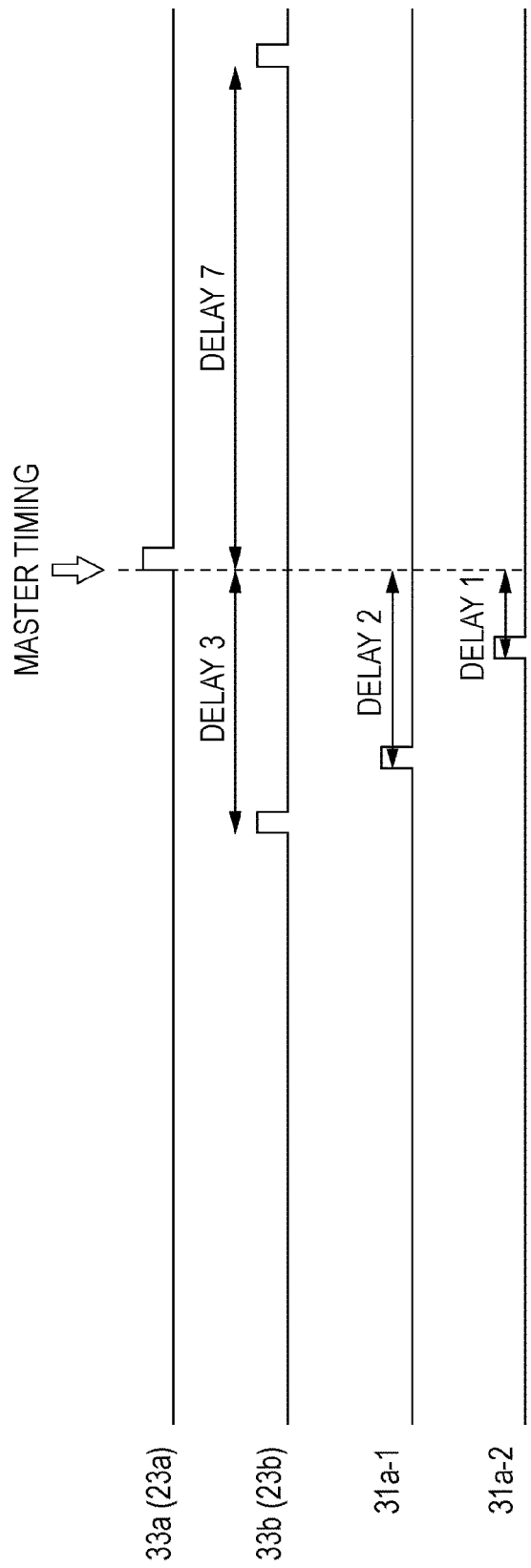
FIG. 15 is a diagram illustrating a total delay in the communication system.

As shown in FIG. 15, when the master timing is set as the CCU 33a of the sub 23a, the delay between the sub 23a and the sub 23b increases by 4 (a delay 7−a delay 3) from the case in which the sub 23b is set as the master timing (FIG. 14).

However, unlike the communication system 20 in FIG. 4, in the line connection configuration (network topology in the case of the Ethernet (registered trademark)) in the communication system 20' in FIG. 13, the delay from the master timing to the camera 31a-1 is 2 (the delay including jitter from the camera 31a-1 to the sub 23a), and the delay from the master timing to the camera 31a-2 is 1 (the delay including jitter from the camera to the sub 23a). The difference in delay between the communication system 20 in FIG. 4 and the communication system 20' in FIG. 13 is caused by the difference between the delay from the perspective of the sub 23b and the delay from the perspective of the sub 23a, which arises due to insertion of the plurality of line switching devices between the line switching device 21-1 and the sub 23a, because the frame synchronization timings of the camera 31a-1 and camera 31a-2 occur cyclically. Hence, the system total delay becomes (a delay 7+a delay 2+a delay 1), so the total delay becomes smaller than that in the case where the sub 23b is set as the master timing (FIG. 14).

In this way, in determining a master timing, by determining a piece of equipment (CCU) that serves as the master timing while also taking into account delays from individual pieces of equipment (CCUs) having frame synchronization timings to individual cameras, the system total delay can be reduced, thereby enabling a system setting with lower delay.

It should be noted that this embodiment is not limited to the configuration shown in FIG. 13. The communication system 20' in FIG. 13 is illustrated for the purpose of describing an environment in which cameras are at different distances to each sub, and this environment is illustrated merely as an example for facilitating understanding. For example, the master timing is to be determined by also taking into account the difference between delays of connecting lines to cameras in individual studios, the difference between delays introduced by equipment in individual subs, and the difference between delays of lines between individual studios. Also, the present invention can be applied to the internal components of a delay. Also, network jitter may not be included.

As described above, the first embodiment presents a method in which, before calculating a delay between each camera and each CCU, arbitration of frame synchronization timing between CCUs is performed, and on the basis of a master timing, each camera is notified of the frame synchronization timing. The second embodiment presents a method in which, when finding a master timing, not only arbitration of frame synchronization timing between CCUs but also calculation of the system total delay is performed by also adding delays between individual cameras and CCUs to arbitration parameters, and the master timing that minimizes the delay for the system as a whole is selected.

Next, a description will be given of a third embodiment in which the delay controller 24 (FIG. 12) is notified of delays between individual cameras and CCUs, and arbitration between these delays is performed in the delay controller 24 to detect a reference delay time for the system, which is different from the frame synchronization timings of the CCUs. It should be noted that in the third embodiment, on the basis of the above-mentioned reference delay time, a synchronization timing externally inputted to each camera is adjusted, and the optimal reference delay time for the system as a whole is determined.

Third Embodiment

Figure 16:
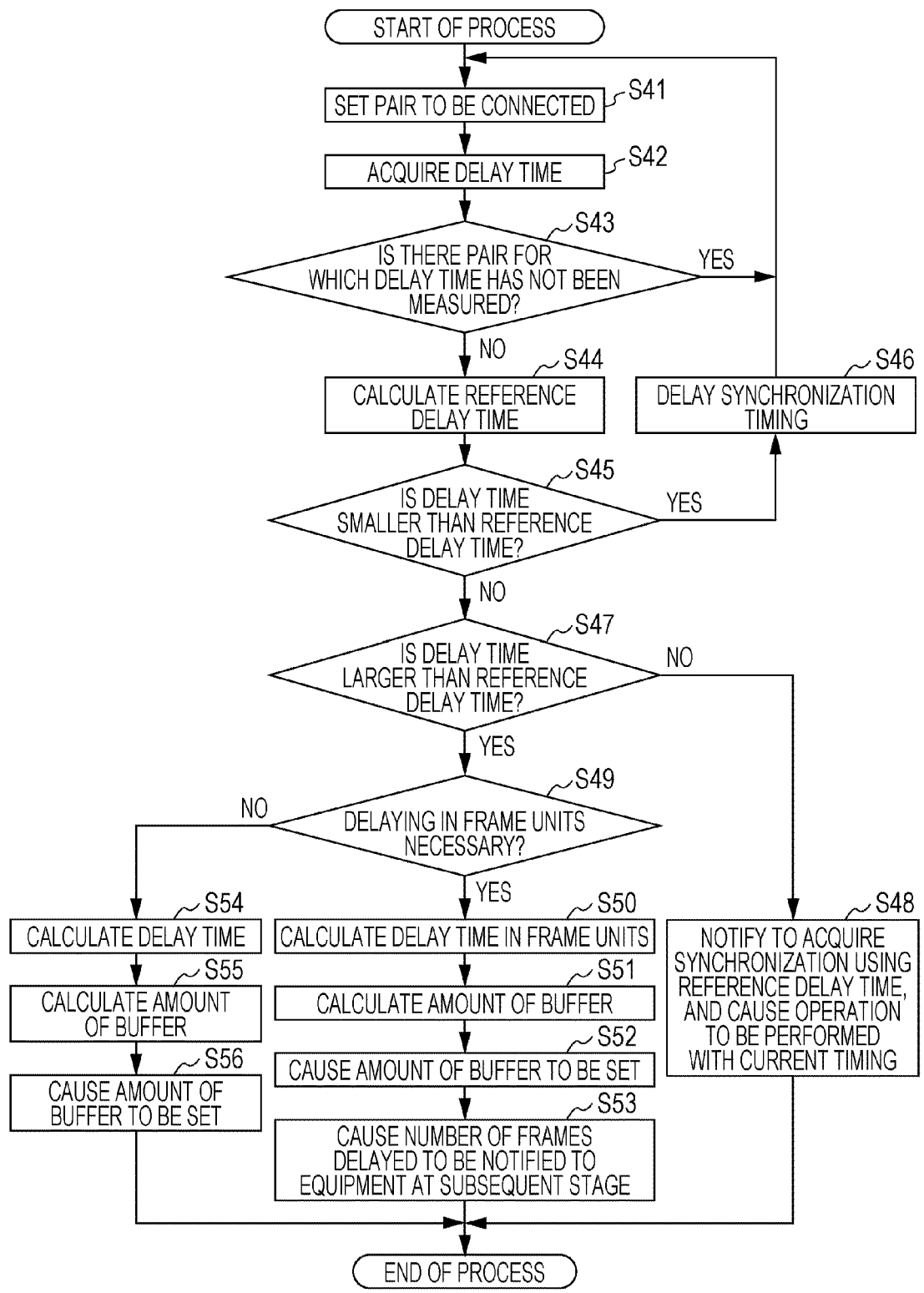
FIG. 16 is a diagram illustrating the flow of a delay control process.

Referring to the flowchart in FIG. 16, a description will be given of a delay control process executed in a communication system according to the third embodiment of the present invention. It should be noted that this process is executed by the same configuration as that of the communication system 20 in FIG. 4.

For example, processing is started at activation of the communication system 20, and in step S41, the delay controller 24 sets a combination that serves as a pair for measuring a delay time, between the cameras 31a-1 to 31c-3 and the CCUs 33a to 33c. That is, the delay controller 24 determines a combination of camera 31 and CCU 33 which serves as a pair, and notifies the corresponding CCU 33 to measure a delay time with respect to the paired camera 31. At this time, for example, the delay controller 24 causes the processing to be performed by setting a provisional master timing that is an arbitrary timing other than the synchronization timings of the CCUs 33a to 33c. Then, the CCU 33 that has received the notification from the delay controller 24 measures a delay and a network jitter with respect to the paired camera 31, and calculates a delay time.

When the CCU 33 notifies the delay controller 24 of the delay time, in step S42, the delay controller 24 acquires the delay time notified from the CCU 33, and the processing proceeds to step S43.

In step S43, the delay controller 24 judges whether or not there is a pair of camera 31 and CCU 33 for which a delay time has not been measured. If it is judged that there is a pair of camera 31 and CCU 33 for which a delay time has not been measured, the processing returns to step S41. That is, by repeating the processes in steps S41 to S43, delay times between all of the pairs of camera 31 and CCU 33 that make up the communication system 20 are calculated.

On the other hand, if the delay controller 24 judges in step S43 that there is no pair of camera 31 and CCU 33 for which a delay time has not been measured, the processing proceeds to step S44. In step S44, the delay controller 24 calculates a reference delay time Tb that is a delay time serving as a reference, on the basis of the delay times between all of the pairs of camera 31 and CCU 33 acquired through the processes in steps S41 to S43.

In step S45, the delay controller 24 judges whether or not the delay time between a pair of camera 31 and CCU 33 is smaller than the reference delay time Tb.

If the delay controller 24 judges in step S45 that the delay time between the corresponding camera 31 and CCU 33 is smaller than the reference delay time Tb, the processing proceeds to step S46. In step S46, the delay controller 24 notifies the CCU 33 to delay the provisional master timing that has been provisionally set, by a time obtained by subtracting a delay time Ts (which is a delay time between the camera 31 and the CCU 33 and is less than the reference delay time Tb) from the reference delay time Tb. After the process in step S46, the processing returns to step S41, and subsequently, the same processing is repeated.

Specifically, since the delay controller 24 calculates a delay management time instant (reference delay time Tb=delay management time instant−camera's image capture time instant) (which is not dependent on the synchronization timing of the CCU 33), on the basis of this delay management time instant, the delay controller 24 notifies the CCU 33 to delay the camera's image capture time instant by a time equal to (reference delay time Tb−delay time Ts). This is to allow video data to be handled at the delay management time instant, even through the delay time between the camera 31 and the CCU 33 is Ts. In step S46, the delay controller 24 transmits to each camera 31a command for making the synchronization timing earlier or later, thereby allowing video data to be handled with reference to the reference management time instant.

On the other hand, if the delay controller 24 judges in step S45 that the delay time between the camera 31 and the CCU 33 is not smaller than the reference delay time Tb (equal to or larger than the reference delay time Tb), the processing proceeds to step S47.

In step S47, the delay controller 24 judges whether or not the delay time between the camera 31 and the CCU 33 is larger than the reference delay time Tb.

If the delay controller 24 judges in step S47 that the delay time between the camera 31 and the CCU 33 is not larger than the reference delay time Tb, the processing proceeds to step S48. That is, in this case, when the judgment in step S45 is also taken into account, it follows that the delay time between the camera 31 and the CCU 33 is the same as the reference delay time Tb.

In step S48, the delay controller 24 notifies the CCU 33 to acquire synchronization using the reference delay time Tb. Consequently, the CCU 33 that has been notified to that effect is set to operate with the reference delay time Tb, that is, continue to operate without setting an amount of video buffer anew, and the delay control process is ended. At this time, the current timing, that is, the provisional master timing that has been provisionally set, is determined as a master timing, and processing is performed using the master timing.

On the other hand, if the delay controller 24 judges in step S47 that the delay time between the camera 31 and the CCU 33 is larger than the reference delay time Tb, the processing proceeds to step S49.

In step S49, the delay controller 24 judges whether or not a delay time T1 between the camera 31 and the CCU 33 (which is a delay time between the camera 31 and the CCU 33 and is larger than the reference delay time Tb) is such a time that makes it necessary to perform delaying in frame units. For example, the delay controller 24 judges that it is necessary to perform delaying in frame units if the delay time T1 is equal to or larger than the 1-frame time, and judges that it is not necessary to perform delaying in frame units if the delay time T1 is less than the 1-frame time.

If the delay controller 24 judges in step S49 that the delay time T1 is such a time that makes it necessary to perform delaying in frame units, the processing proceeds to step S50.

In step S50, the delay controller 24 calculates a delay time in frame units. For example, the delay controller 24 calculates (reference delay time Tb+number of frames n×1-frame time Tfr)−delay time T1 as the delay time in frame units. Here, the number of frames n is the number of frames to be delayed.

In step S51, on the basis of the delay time in frame units calculated in step S50, the delay controller 24 calculates the amount of buffer necessary for accumulating image data for the delay time. In step S52, the delay controller 24 notifies the CCU 33 of the amount of buffer calculated in step S51, and causes the CCU 33 to set the amount of buffer. Consequently, the delay of images arriving at the CCU 33 becomes a delay of exactly n frames with respect to the reference delay time Tb. Here, the number of frames n to be delayed is determined so as to satisfy the following relationship: reference delay time Tb+number of frames n×1-frame time Tfr>delay time T1.

It should be noted that the process of calculating and setting an amount of buffer may be performed on the CCU 33 side as well. That is, the delay controller 24 may notify the CCU 33 of the delay time in frame units calculated in step S50, and the CCU 33 may calculate and set an amount of buffer.

In step S53, the delay controller 24 notifies the CCU 33 to notify equipment at the stage subsequent to the CCU 33 of the number of frames n delayed. In response to the this notification, the CCU 33 notifies the equipment at the subsequent stage of the number of frames n, and the delay control process is ended.

On the other hand, if the delay controller 24 judges in step S49 that the delay time T1 is not such a time that makes it necessary to perform delaying in frame units, the processing proceeds to step S54.

In step S54, the delay controller 24 calculates a delay time (delay time less than the 1-frame time). For example, the delay controller 24 calculates (reference delay time Tb+1-frame time Tfr)−delay time T1 as the delay time.

Thereafter, in step S55, on the basis of the delay time calculated in step S54, the delay controller 24 calculates the amount of buffer necessary for accumulating image data for the delay time. In step S52, the delay controller 24 notifies the CCU 33 of the amount of buffer, and causes the CCU 33 to set the amount of buffer. It should be noted that the process of calculating and setting an amount of buffer may be performed on the CCU 33 side as well. Also, the amount of buffer corresponding to the delay time is set to be as small as possible. After the process in step S56, the delay control process is ended.

As described above, in the third embodiment, by detecting a reference delay time for the system which is different from the frame synchronization timing of each CCU, synchronization timing externally inputted to each camera is adjusted, and the optimal reference delay time for the system as a whole can be determined.

For example, in the first and second embodiments, since timing management is performed with a given CCU 33 as a master, system timing management can be performed relatively easily. On the other hand, in the third embodiment, rather than being dependent on the frame synchronization timing of a given CCU 33, a peer-to-peer delay is measured, thus allowing for more flexible measurement. Therefore, the third embodiment is suitable for processing in environments where only one CCU 33 is outstandingly delayed among a plurality of CCUs 33 (that differ in frame synchronization timing), or in the case where a delay equal to or more than the frame synchronization interval occurs.

In the third embodiment, letting the delay time serving as a reference be Tb, since the connection environments between the individual cameras 31 and CCUs 33 differ, there are cases when a delay is smaller than the reference delay time Tb (delay time Ts), and when a delay is larger than the reference delay time Tb (delay time T1). Accordingly, if the delay between the camera 31 and the CCU 33 is smaller than the reference delay time Tb (delay time Ts), the delay controller 24 instructs the target camera to delay the image capture timing by a time obtained by subtracting the delay time Ts from the reference delay time Tb. Consequently, the delay of video arriving at the CCU 33 is adjusted to be equal to the reference delay time Tb between the camera 31 and the CCU 33.

It should be noted that since it is desired for the delay controller 24 to determine the reference delay time by also taking into account an amount of video buffer equivalent to a network jitter grasped by the CCU 33, the number of measurements may be increased until the network jitter is grasped.

In the third embodiment, if a delay is larger than the reference delay time Tb (delay time T1), the system can select between two cases. One approach is to adjust the amount of video buffer for the CCU 33 to a delay time equal to (reference delay time Tb+1-frame time Tfr)−delay time T1, so that the system is built with the minimum delay. This approach is effective for applications where it is desired to reduce the delay of the system as a whole as much as possible.

The other approach is such that, in order for a delay to be set in frame units, the delay controller 24 instructs the CCU 33 to set a video buffer for a time equal to (reference delay time Tb+number of frames n×1-frame time Tfr)−delay time T1. The CCU 33 adjusts the delay of arriving video so that the video is delayed by exactly n frames with respect to the reference delay Tb. Here, the 1-frame time Tfr is the time of one frame, and the number of frames n is so determined as to satisfy the following relationship: reference delay time Tb+number of frames n×1-frame time Tfr>delay time T1. In systems according to the related art, when, for example, the sub 23a and the sub 23b are switched between in FIG. 4, repetition of picture due to the n-frame delay occurs. In this regard, this approach is effective, even just for avoiding disturbances in picture due to switching by the above function.

Further, by providing the function of displaying an indication that video data to be inputted is delayed by n frames, to broadcasting equipment connected at the stage subsequent to each sub 23, it is possible to remove repetition of picture in the equipment at the subsequent stage.

While the delay controller 24 is used for arbitration, other than the configuration in which the delay controller 24 is connected to the line switching device 21, the delay controller 24 may be built in the CCU 33.

Further, for example, in step S45, the reference delay time Tb may be set to the maximum delay between each camera 31 and each given CCU 33. With regard to adjustment of the camera's image capture time instant, if there is an absolute temporal axis (for example, a clock) for the system as a whole, the synchronization timing may be specified by a time instant. It should be noted that while this embodiment sets only an amount of video buffer, delay adjustment may be performed by using both a buffer and PLL phase adjustment.

While in this embodiment the description is directed to the case of a communication system including cameras that transmit image data and CCUs that control the cameras, the present invention is not limited to such a configuration. The present invention can be applied to a communication system including transmitters that transmit data, and controllers that control the transmitters, and to a delay controller that controls delay in the communication system.

As has been described in the foregoing, while connections between cameras and CCUs are made by optical fiber cables, triax cables, or composite cables called multi-cables in camera systems for performing live relay broadcast according to the related art, the delay controller, the control method, and the communication system according to an embodiment of the present invention can be adapted to general-purpose lines such as the Ethernet (registered trademark), NGN, and wireless. Since such general-purpose lines are very inexpensive in comparison to dedicated lines or satellite lines, a live relay broadcasting system can be built at low cost.

In addition, the adaptability to live relay broadcasting control stations with different frame synchronization timings allows for easy system extensions, thereby making it possible to build a fit-for-purpose system configuration. For example, while in the related art relay broadcasting is provided by switching between studios within the same broadcasting station facility, for live relay broadcasting to a studio in a different facility or to a distant facility as well, relay switching or the like can be performed by the same timing/operation as that in the related art.

Further, since cameras can be genlocked through an asynchronous network, even in situations where simultaneous relay broadcasting is provided with a plurality of relay broadcasting control stations and a plurality of cameras, by using a line-based codec, and implementing a synchronization acquiring method suited for the line-based codec, high-quality camera images can be transmitted with low delay. Consequently, it is possible to maintain a low level of delay that enables high speed switching of real-time images which is the core technology of live relay broadcasting.

Incidentally, in the first to third embodiments, as described above with reference to FIGS. 9A to 9D, synchronization is acquired between the CCUs 33a to 33c and the cameras 31a-1 to 31c-3 by using a frame synchronization time stamp contained in an IP packet. At this time, it is desired to achieve high precision synchronization while maintaining a low level of delay that enables high speed switching of real-time images which is the core technology of live relay broadcasting.

Fourth Embodiment

In a fourth embodiment, system synchronization is achieved by performing two kinds of synchronization acquisition. The fourth embodiment relates to, for example, a packet format which makes it possible to acquire synchronization performed in a line control layer such as the Ethernet (registered trademark) or NGN (hereinafter, referred to as line control layer synchronization), and further, acquire synchronization in a video control layer that performs synchronization at the video frame or video picture level, on the basis of a packet that has been moderately synchronized by the line control layer (hereinafter, referred to as video control layer synchronization).

First, referring to FIG. 17, a synchronization method for video control layer synchronization will be described. It should be noted that video control layer synchronization is performed prior to calculating the delay time described above in the first to third embodiments.

Figure 17:
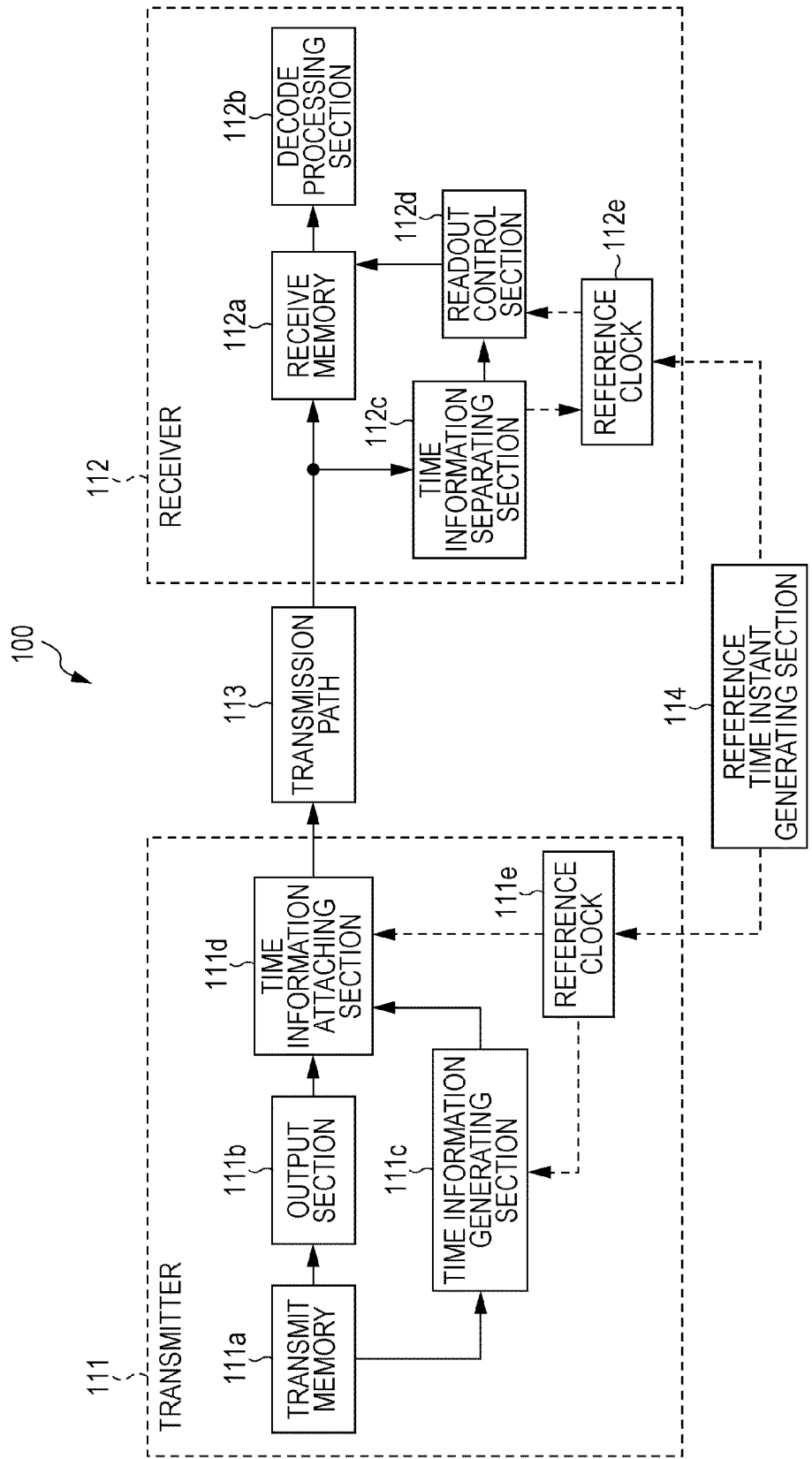
FIG. 17 is a diagram illustrating a synchronization method for video control layer synchronization.

In a data transmission system 100 shown in FIG. 17, a data stream is transmitted from a transmitter 111 to a receiver 112. The transmitter 111 corresponding to a transmitting section of the camera 31 mentioned above, and the receiver 112 corresponding to a receiving section of the CCU 33 described above.

The data transmission system 100 is a system for transmitting a data stream such as moving image data or audio data, and reproducing and outputting the data stream in real time. The data transmission system 100 includes the transmitter 111 that transmits a data stream, the receiver 112 that receives the data stream, and a transmission path 113 (for example, a line including the above-described line switching device 21) through which the data stream is transmitted between these devices.

The transmitter 111 includes a transmit memory 111a for temporarily accumulating a generated data stream, an output section 111b that packetizes output data from the transmit memory 111a, and outputs the resulting packets to the transmission path 113, a time information generating section 111c that generates time information to be transmitted to the receiver 112, and a time information attaching section 111d that attaches time information to the output data from the output section 111b.

The receiver 112 includes a receive memory 112a for temporarily accumulating a data stream received via the transmission path 113, a decode processing section 112b that performs a decode process on the output data from the receive memory 112a, a time information separating section 112c that separates time information attached to a received data stream, and a readout control section 112d that controls the readout timing of a data stream from the receive memory 112a. It should be noted that the transmitter 111 and the receiver 112 may be respectively provided with reference clocks 111e and 112e that each generate a time instant that serves as a reference for the time information transmitted from the transmitter 111. Also, the reference clocks 111e and 112e may each generate a time instant on the basis of reference time instant information received from a reference time instant generating section 114 that is externally provided.

The transmission path 113 is implemented as a communication network, such as an Ethernet (registered trademark) line (including a LAN), NGN, or a wireless LAN, or the like.

A data stream encoded in a predetermined encoding scheme by an encoding section is supplied to the transmitter 111 (not shown). This data stream may be supplied via a storage medium such as a hard disk. The supplied data stream is temporarily accumulated in the transmit memory 111a, supplied to the output section 111b, and outputted to the transmission path 113.

In the receiver 112, a received data stream is temporarily accumulated in the receive memory 112a, supplied to the decode processing section 112b to undergo a decoding process, and content based on this data stream is outputted by an output section such as a monitor or a speaker (not shown).

In such transmission of a data stream, the transmission delay time until the data stream generated by the encoding section is supplied to the decode processing section 112b of the receiver 112 is adjusted to be constant to a degree, thereby establishing synchronization between the input data to the encoding section and the output data from the decode processing section 112b.

The data transmission system 100 is configured as described above. Packetized data is transmitted and received, and by using time stamps contained in the packets, the above-described line control layer synchronization and video control layer synchronization are performed.

Here, referring to FIG. 18, a description will be given of the frame format of an IP packet as a first structural example of a packet which is used for achieving line control layer synchronization and video control layer synchronization in this embodiment.

Figure 18:
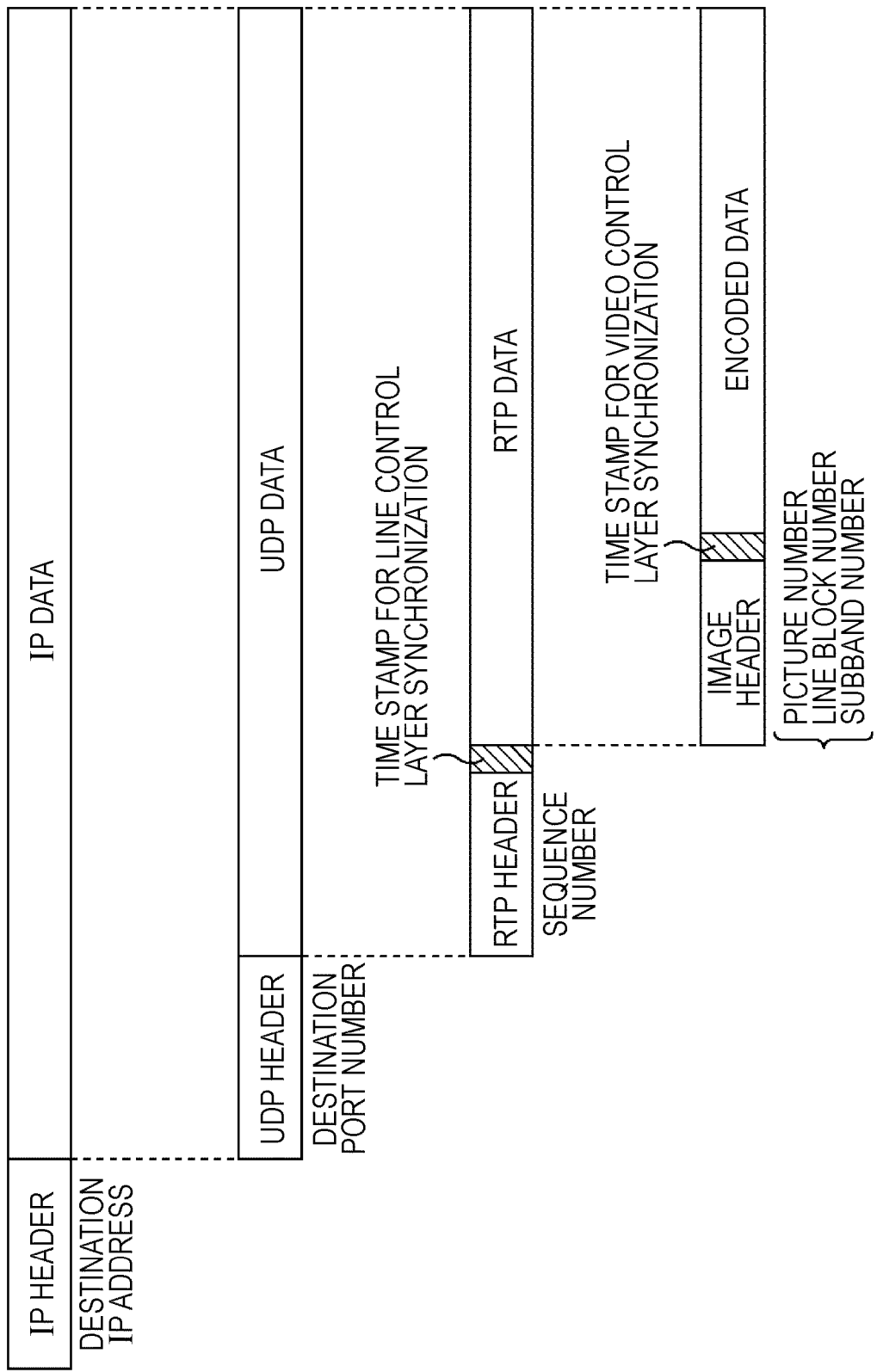
FIG. 18 is a diagram illustrating the frame format of an IP packet as a first structural example.

As shown in FIG. 18, an IP packet is made up of an IP header and IP data. The IP header contains, for example, control information related to control of communication paths based on the IP protocol such as a destination IP address. The IP data is further made up of a UDP header and UDP data. The UDP is a protocol at the transport layer of the OSI reference model, which is generally used for applications such as delivery of moving image or audio data for which real-timeness is regarded as important. The UDP header contains, for example, a destination port number, which is application identification information.

The UDP data is further made up of an RTP header and RTP data. The RTP header contains, for example, control information for ensuring real-timeness of a data stream such as a sequence number. The RTP header contains a time stamp for line control layer synchronization.

The RTP data is made up of an image header, and encoded data that is the main body of an image compressed on the basis of a line-based codec. The image header can contain, for example, a picture number, a line block number (or a line number in the case when encoding is to be done in one-line units), or a subband number. The image header contains a time stamp for video control layer synchronization.

In this way, the IP packet is configured so that the time stamp for line control layer synchronization is contained in the RTP header, and the time stamp for video control layer synchronization is contained in the image header. Here, the time stamp for line control layer synchronization and the time stamp for video control layer synchronization may not be synchronized with each other.

Next, referring to FIG. 19, a description will be given of a device that generates and transmits such an IP packet, and outputs data contained in a transmitted IP packet. While in FIG. 17 the transmitter 111 and the receiver 112 are configured as different devices, in FIG. 19, a description will be given of an imaging display device including a transmitting function and a receiving function as an example.

Figure 19:
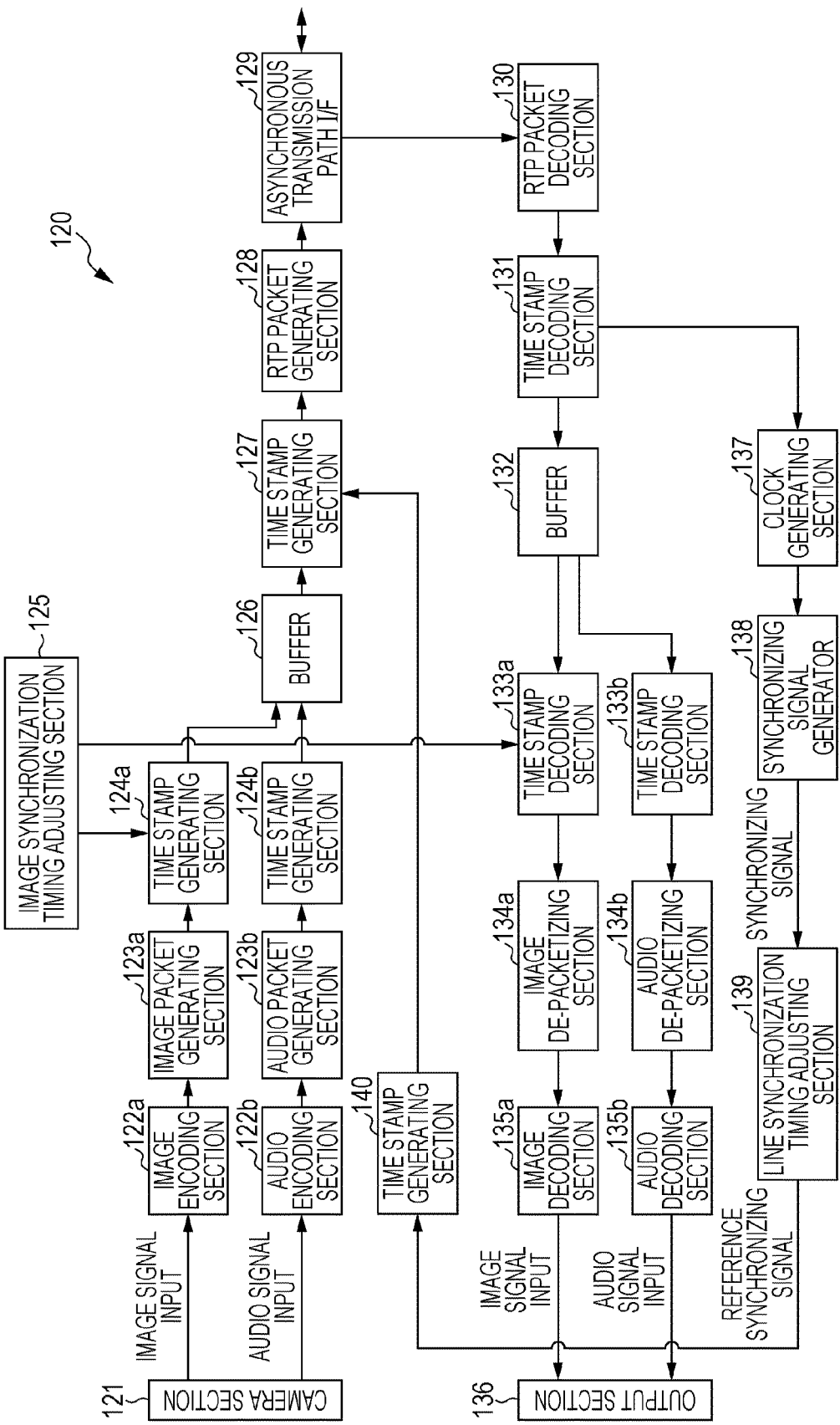
FIG. 19 is a block diagram showing an example of the configuration of an imaging display device according to an embodiment of the present invention.

FIG. 19 is a block diagram showing an example of the configuration of an imaging display device according to an embodiment of the present invention.

An imaging display device 120 in FIG. 19 can packetize a signal including a captured image and audio and output the packetized signal to an asynchronous transmission path (i.e., functioning as the studio 22 in FIG. 4), and can also restore and output a packetized signal transmitted via the asynchronous transmission path (i.e., functioning as the sub 23 in FIG. 4). It should be noted that the structure of a packet generated in the imaging display device 120 will be described with reference to FIG. 20.

The imaging display device 120 includes a camera section 121, an image encoding section 122a, an audio encoding section 122b, an image packet generating section 123a, an audio packet generating section 123b, time stamp generating sections 124a and 124b, an image synchronization timing adjusting section 125, a buffer 126, a time stamp generating section 127, an RTP packet generating section 128, an asynchronous transmission path I/F (interface) 129, an RTP packet decoding section 130, a time stamp decoding section 131, a buffer 132, time stamp decoding sections 133a and 133b, an image de-packetizing section 134a, an audio de-packetizing section 134b, an image decoding section 135a, an audio decoding section 135b, an output section 136, a clock generating section 137, a synchronizing signal generator 138, a line synchronization timing adjusting section 139, and a time stamp generating section 140.

The imaging display device 120 can output a signal including an image and audio acquired by the camera section 121 to an asynchronous transmission path (i.e., functioning as the studio 22 in FIG. 4), and can also restore a signal transmitted via the asynchronous transmission path and outputs the restored signal to the output section 136 (i.e., functioning as the sub 23 in FIG. 4).

The camera section 121 includes an imaging section such as a CCD or CMOS sensor, an audio input section such as a microphone, and the like, and acquires an image and audio. An image signal corresponding to the image acquired by the camera section 121 is inputted to the image encoding section 122a, and an audio signal corresponding to the audio acquired by the camera section 121 is inputted to the audio encoding section 122b.

The image encoding section 122a encodes and compresses the image signal, and supplies the encoded data to the image packet generating section 123a. The audio encoding section 122b encodes and compresses the audio signal, and supplies the encoded data to the audio packet generating section 123b.

The image packet generating section 123a sets the encoded data of image signal to the size of one packet, attaches an image header, and packetizes the encoded data. The image packet generating section 123a supplies the packetized encoded data of image signal to the time stamp generating section 124a. Likewise, the audio packet generating section 123b supplies packetized encoded data of audio signal to the time stamp generating section 124b.

The time stamp generating section 124a attaches a time stamp synchronized to media, that is, a time stamp for video control layer synchronization (FIG. 18) to the packetized encoded data of image signal. Likewise, the time stamp generating section 124b attaches a time stamp synchronized to media, to the packetized encoded data of audio signal.

The image synchronization timing adjusting section 125 adjusts the timing of the time stamp for video control layer synchronization that is attached by the time stamp generating section 124a. The image synchronization timing adjusting section 125 also adjusts the timing of the time stamp for video control layer synchronization also with respect to the time stamp decoding section 133a.

The encoded data with the time stamp attached in the time stamp generating section 124a, and the encoded data with the time stamp attached in the time stamp generating section 124b are supplied to the buffer 132, and multiplexed in the buffer 132.

The time stamp generating section 127 attaches a time stamp for line control layer synchronization (FIG. 18) to the data multiplexed in the buffer 132, and supplies the resulting data to the RTP packet generating section 128. It should be noted that a time stamp for line control layer synchronization, which is generated in the time stamp generating section 140 by referencing a reference synchronizing signal as will be described later, is supplied to the time stamp generating section 127, and the time stamp generating section 127 attaches the time stamp for line control layer synchronization.

The RTP packet generating section 128 attaches an RTP header to RTP data containing encoded data and an image header, and supplies the RTP data to the asynchronous transmission path I/F.

The asynchronous transmission path I/F 129 attaches a time stamp and an IP header, and outputs the resulting data to an asynchronous transmission path. For example, when the imaging display device 120 is seen as the camera 31 in FIG. 4, the asynchronous transmission path I/F 129 transmits packets to the CCU 33 via the asynchronous transmission path. On the other hand, when the imaging display device 120 is seen as the CCU 33 in FIG. 4, the asynchronous transmission path I/F 129 receives packets transmitted from the camera 31 via the asynchronous transmission path.

The RTP packet decoding section 130 is supplied with packets (such as an image data packet, an audio data packet, and a command data packet) received by the asynchronous transmission path I/F 129. The RTP packet decoding section 130 decodes each packet, and supplies the decoded packet to the time stamp decoding section 131.

The time stamp decoding section 131 checks the IP header, the UDP header, and the RTP header. Then, the RTP header containing image data and audio data is supplied to the buffer 132, and the time stamp for line control layer synchronization (FIG. 18) attached after the RTP header s supplied to the clock generating section 137.

In the buffer 132, data is separated into a packet of encoded data of image signal, and a packet of encoded data of audio signal by a De-MUX circuit.

The packet of encoded data of image signal is supplied to the time stamp decoding section 133a, and a time stamp synchronized to media, that is, the time stamp for video control layer synchronization (FIG. 18) is extracted. The time stamp for video control layer synchronization is used for generating a clock or a synchronizing signal in the output section 136.

The image de-packetizing section 134a de-packets the packet of encoded data of image signal supplied from the time stamp decoding section 133a, and supplies the encoded data of image signal to the image decoding section 135a. The image decoding section 135a decodes the encoded data of image signal, and outputs the image signal to the output section 136.

The time stamp decoding section 133b, the audio de-packetizing section 134b, and the audio decoding section 135b output the audio signal contained in the packet of encoded data of audio signal to the output section 136, in the same manner as the time stamp decoding section 133a, the image de-packetizing section 134a, and the image decoding section 135a.

Consequently, the image and audio transmitted via the asynchronous transmission path are outputted from the output section 136.

The clock generating section 137 generates a clock of a predetermined frequency, and supplies the clock to the synchronizing signal generator 138. The synchronizing signal generator 138 generates a synchronizing signal from the clock, and supplies the synchronizing signal to the line synchronization timing adjusting section 139.

The line synchronization timing adjusting section 139 is supplied with the synchronizing signal from the synchronizing signal generator 138, and is also supplied with the time stamp for line control layer synchronization from the time stamp decoding section 131 via the clock generating section 137 and the synchronizing signal generator 138. Then, on the basis of the time stamp for line control layer synchronization, the line synchronization timing adjusting section 139 adjusts the synchronizing signal, and outputs a reference synchronizing signal that is referenced when the time stamp generating section 140 generates a time stamp.

The time stamp generating section 140 references the reference synchronizing signal from the line synchronization timing adjusting section 139, and generates the time stamp for line control layer synchronization to be supplied to the time stamp generating section 127.

In the imaging display device 120 configured as described above, with a packet moderately synchronized on the basis of a time stamp for line control layer synchronization contained in the packet, it is possible to acquire synchronization in the video control layer for achieving synchronization at the video frame or video picture level (hereinafter, referred to as video control layer synchronization), on the basis of a time stamp for video control layer synchronization. Thus, high precision synchronization can be achieved while maintaining a low level of delay that enables high speed switching of real-time images which is the core technology of live relay broadcasting.

It should be noted that if the bandwidth of the asynchronous transmission path is sufficiently broad relative to a signal, the image encoding section 122a and the audio encoding section 122b are unnecessary, and the signal may be converted into IP packets without being compressed. In that case, the image decoding section 135a and the audio decoding section 135b in FIG. 19 are also unnecessary.

Next, referring to FIG. 20, a description will be given of the frame format of an IP packet as a second structural example of a packet.

Figure 20:
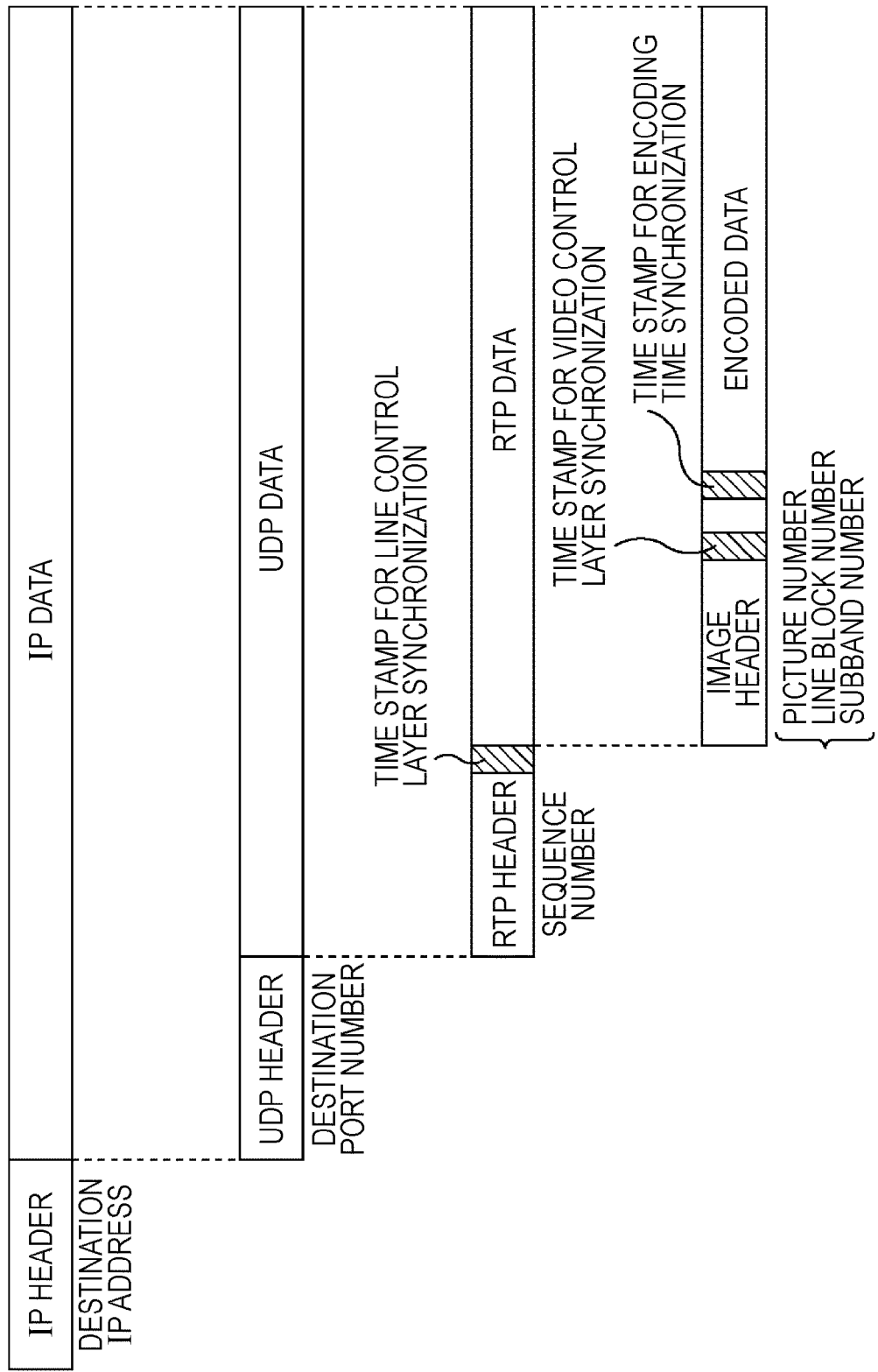
FIG. 20 is a diagram illustrating the frame format of an IP packet as a second structural example.

The IP packet shown in FIG. 20 is different from the IP packet shown in FIG. 18 in that a time stamp for encoding time synchronization is included in encoded data, and is otherwise the same. The time stamp for line control layer synchronization and the time stamp for video control layer synchronization may not be synchronized with each other, and the time stamp for video control layer synchronization and the time stamp for encoding time synchronization are synchronized with each other.

By attaching the time stamp for encoding time synchronization to the IP packet in addition to the time stamp for line control layer synchronization and the time stamp for video control layer synchronization as shown in FIG. 20, for example, the timing at which encoded data is decoded in each of the image decoding section 135a and the audio decoding section 135b in FIG. 19 can be set with greater precision, thereby achieving lower delay.

It should be noted that in the case of using the IP packet according to the second structural example, in the imaging display device 120 in FIG. 19, it is necessary to provide a time stamp generating section that generates a time stamp for encoding time synchronization, between the image encoding section 122a and the image packet generating section 123a, and also between the audio encoding section 122b and the audio packet generating section 123b. Further, it is necessary to provide a decoding section that decodes the time stamp for encoding time synchronization, between the image de-packetizing section 134a and the image decoding section 135a, and also between the audio de-packetizing section 134b and the audio decoding section 135b.

Next, referring to FIG. 21, a description will be given of the frame format of an IP packet as a third structural example of a packet.

Figure 21:
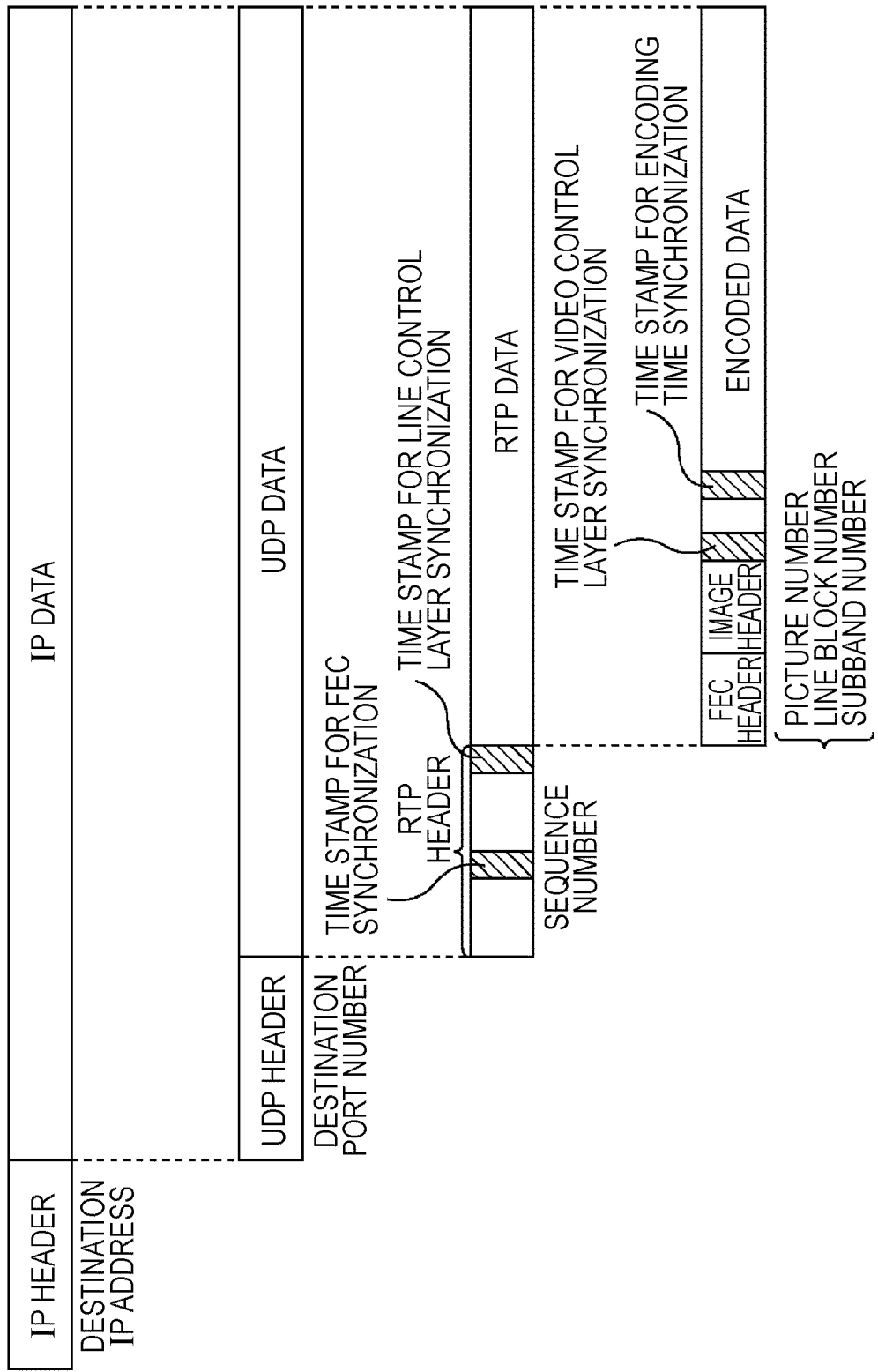
FIG. 21 is a diagram illustrating the frame format of an IP packet as a third structural example.

The IP packet shown in FIG. 21 is different from the IP packet shown in FIG. 20 in that a time stamp for FEC (Forward Error Correction) synchronization is contained in the RTP header and that an FEC header is attached to the beginning of the image header, and is otherwise the same. The time stamp for line control layer synchronization and the time stamp for video control layer synchronization may not be synchronized with each other, and the time stamp for FEC synchronization, the time stamp for video control layer synchronization, and the time stamp for encoding time synchronization are synchronized with each other.

By attaching the FEC header and the time stamp for FEC synchronization to the IP packet as shown in FIG. 21, erasure correction can be performed on packets whose jitter has been removed by FEC, on the basis of the time stamp for FEC synchronization, thereby achieving lower delay.

It should be noted that in the case of using the IP packet according to the third structural example, in the imaging display device 120 in FIG. 19, it is necessary to provide, at the stage subsequent to the buffer 132, a processing section that performs erasure correction on packets whose jitter has been removed by FEC, on the basis of the time stamp for FEC synchronization. It is also necessary to provide a generating section that generates the FEC header and the time stamp for FEC synchronization. The IP packet according to the third structural example corresponds to a standardized RTP packet.

It is supposed that in the IP packet according to each of the second and third structural examples as well, line control layer synchronization and video control layer synchronization are performed.

As described above, in the fourth embodiment, high precision synchronization can be achieved while maintaining a low level of delay that enables high speed switching of real-time images which is the core technology of live relay broadcasting. That is, in the case of the line-based codec described above, as compared with a picture-based codec, the time that can be spent for computation becomes extremely short.

To overcome problems resulting from the fact that only an extremely short time can be spent for computation as described above, a process is performed in which, while keeping the total time of the waiting time of a transmit buffer and the waiting time of a receive buffer constant, the ratio between the waiting time of the transmit buffer and the waiting time of the receive buffer constant is changed. For example, when encoding complex image data, the waiting time is changed so as to increase the waiting time of the buffer spent for transmission while reducing the waiting time of the receive buffer. By making the waiting time of the transmit buffer longer in this way, a large amount of data temporarily generated by a complex image can be absorbed in the manner of a system delay.

For example, in the related art, while a buffer for absorbing the jitter of a received packet due to a line delay is provided for picture delay, it has not been possible to isolate the line delay and the waiting time of the receive buffer from each other. The inability to achieve this isolation leads to the necessity for unnecessarily large buffer, which affects the building of a low delay system.

In contrast, in this embodiment, the line delay and the waiting time of the receive buffer can be isolated from each other, and the waiting time of the receive buffer can be so determined to as keep the total time constant in accordance with the waiting time of the transmit buffer, thereby achieving synchronization with lower delay. Further, in this embodiment, by making it possible to change the ratio between the waiting time of the transmit buffer and the waiting time of the receive buffer at a very short time interval, data of high image quality can be transmitted even with low delay.

The series of processes described above can be either executed by hardware or executed by software. If the series of processes is to be executed by software, a program constituting the software is installed into a computer embedded in dedicated hardware, or into, for example, a general-purpose personal computer that can execute various kinds of function when installed with various kinds of program, from a program-recording medium.

FIG. 22 is a block diagram showing an example of the hardware configuration of a computer that executes the above-mentioned series of processes.

In the computer, a CPU (Central Processing Unit) 201, a ROM (Read Only Memory) 202, and a RAM (Random Access Memory) 203 are connected to each other via a bus 204.

The bus 204 is further connected with an input/output interface 205. The input/output interface 205 is connected with an input section 206 formed by a keyboard, a mouse, a microphone, or the like, an output section 207 formed by a display, a speaker, or the like, a storage section 208 formed by a hard disk, a non-volatile memory, or the like, a communication section 209 formed by a network interface or the like, and a drive 210 for driving a removable medium 211 such as a magnetic disc, an optical disc, a magneto-optical disc, or a semiconductor memory.

In the computer configured as described above, the above-mentioned series of processes is performed when the CPU 201, for example, loads a program stored in the storage section 208 into the RAM 203 via the input/output interface 205 and the bus 204, and executes the program.

The program executed by the computer (CPU 201) is provided by being recorded on the removable medium 211 that is a packaged medium formed by, for example, a magnetic disc (including a flexible disc), an optical disc (such as a CD-ROM (Compact Disc-Read Only Memory) or a DVD (Digital Versatile Disc)), a magneto-optical disc, a semiconductor memory, or the like, or via a wired or wireless transmission medium such as a local area network, the Internet, or digital satellite broadcast.

Then, the program can be installed into the storage section 208 via the input/output interface 205, by inserting the removable media 211 in the drive 210. Also, the program can be received by the communication section 209 via a wired or wireless transmission medium, and installed into the storage section 208. Alternatively, the program can be pre-installed into the ROM 202 or the storage section 208.

It should be noted that the program executed by the computer may be a program in which processes are performed in a time-series fashion in the order as described in this specification, or may be a program in which processes are performed at necessary timing such as when invoked.

The term system as used in this specification refers to the entirety of an apparatus made up of a plurality of devices.

The present application contains subject matter related to that disclosed in Japanese Priority Patent Application JP 2010-090961 filed in the Japan Patent Office on Apr. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A delay controller comprising:
   acquiring means for acquiring synchronization timings indicating timings when a plurality of controllers synchronously control, via a line, transmitters that transmit data;
   determining means for determining a reference synchronization timing serving as a reference for synchronization among the controllers, at least in part on the basis of the synchronization timings acquired by the acquiring means; and
   synchronization information transmitting means for transmitting synchronization information to the controllers, the synchronization information being used when the controllers receive data from each of the transmitters at the reference synchronization timing determined by the determining means; wherein:
   the determining means determines, as the reference synchronization timing, a synchronization timing of a controller of the plurality of controllers which minimizes a delay with respect to each of synchronization timings of other controllers of the plurality of controllers.

2. The delay controller according to claim 1, wherein the determining means calculates a system total delay for all of the controllers, and determines, as the reference synchronization timing, a synchronization timing of one of the controllers which minimizes the system total delay, the system total delay being a sum total of delays of data transmitted between the transmitters and the controllers in a case where a synchronization timing of an arbitrary one of the controllers is assumed as the reference synchronization timing.

3. The delay controller according to claim 1, wherein with respect to each of combinations of all of the transmitters and all of the controllers, if a delay of data transmitted between each of the transmitters and each of the controllers at a provisional reference synchronization timing that is set provisionally is smaller than a predetermined reference delay that is calculated from all of the delays, the determining means repeats delaying the provisional reference synchronization timing, and determines, as the reference synchronization timing, the provisional reference synchronization timing that makes the delay larger than or equal to the reference delay.

4. The delay controller according to claim 3, wherein with respect to each of combinations of all of the transmitters and all of the controllers, if a delay of data transmitted between each of the transmitters and each of the controllers at the provisional reference synchronization timing that is set provisionally is larger than the reference delay, and if the delay is larger than or equal to a predetermined unit amount in which processing is performed in each of the transmitters, each of the controllers accumulates data delayed by a delay in units of the unit amount.

5. The delay controller according to claim 4, wherein with respect to each of combinations of all of the transmitters and all of the controllers, if a delay of data transmitted between each of the transmitters and each of the controllers at the provisional reference synchronization timing that is set provisionally is larger than the reference delay, and if the delay is smaller than the predetermined unit amount in which processing is performed in each of the transmitters, each of the controllers accumulates data delayed by the delay.

6. The delay controller according to claim 1, wherein:
   each of the transmitters is a device that transmits image data, splits a picture into sets of N lines (N is larger than or equal to 1), and encodes and transmits an image for each of the sets; and
   each of the controllers controls switching of the image data transmitted from the transmitters.

7. A control method for a delay controller, comprising the steps of:
   acquiring, by the delay controller, synchronization timings indicating timings when a plurality of controllers synchronously control, via a line, transmitters that transmit data;
   determining, by the delay controller, a reference synchronization timing serving as a reference for synchronization among the controllers, at least in part on the basis of the acquired synchronization timings; and
   transmitting, by the delay controller, synchronization information to the controllers, the synchronization information being used when the controllers receive data from each of the transmitters at the determined reference synchronization timing; wherein:
   determining the reference synchronization timing comprises determining a synchronization timing of a controller of the plurality of controllers which minimizes a delay with respect to each of synchronization timings of other controllers of the plurality of controllers.

8. A communication system comprising:
   a plurality of transmitters to transmit data;
   a plurality of controllers to control the plurality of transmitters via a line;
   a delay controller to control delay of data transmitted between each of the transmitters and each of the controllers;
   acquiring means for acquiring synchronization timings indicating timings when the controllers synchronously control the transmitters;
   determining means for determining a reference synchronization timing that serves as a reference for synchronization among the controllers, at least in part on the basis of the synchronization timings acquired by the acquiring means; and
   synchronization information transmitting means for transmitting synchronization information to the controllers, the synchronization information being used when the controllers receive data from each of the transmitters at the reference synchronization timing determined by the determining means; wherein:
   the determining means determines, as the reference synchronization timing, a synchronization timing of a controller of the plurality of controllers which minimizes a delay with respect to each of synchronization timings of other controllers of the plurality of controllers.

9. A control method for a communication system, the communication system including
   a plurality of transmitters to transmit data,
   a plurality of controllers to control the transmitters via a line, and
   a delay controller to control delay of data transmitted between each of the transmitters and each of the controllers, the control method comprising the steps of:
   acquiring, by the delay controller, synchronization timings indicating timings when the controllers synchronously control the transmitters;
   determining, by the delay controller, a reference synchronization timing that serves as a reference for synchronization among the controllers, at least in part on the basis of the acquired synchronization timings; and transmitting, by the delay controller, synchronization information to the controllers, the synchronization information being used when the controllers receive data from each of the transmitters at the determined reference synchronization timing; wherein:

determining the reference synchronization timing comprises determining a synchronization timing of a controller of the plurality of controllers which minimizes a delay with respect to each of synchronization timings of other controllers of the plurality of controllers.

10. A delay controller comprising:

an acquiring section to acquire synchronization timings indicating timings when a plurality of controllers synchronously control, via a line, transmitters that transmit data;

a determining section to determine a reference synchronization timing serving as a reference for synchronization among the controllers, at least in part on the basis of the synchronization timings acquired by the acquiring section; and a synchronization information transmitting section to transmit synchronization information to the controllers, the synchronization information being used when the controllers receive data from each of the transmitters at the reference synchronization timing determined by the determining section; wherein:

the determining section determines, as the reference synchronization timing, a synchronization timing of a controller of the plurality of controllers which minimizes a delay with respect to each of synchronization timings of other controllers of the plurality of controllers.

11. A communication system comprising:

a plurality of transmitters to transmit data;

a plurality of controllers to control the transmitters via a line;

a delay controller to control delay of data transmitted between each of the transmitters and each of the controllers;

an acquiring section to acquires synchronization timings indicating timings when the controllers synchronously control the transmitters;

a determining section to determine a reference synchronization timing that serves as a reference for synchronization among the controllers, at least in part on the basis of the synchronization timings acquired by the acquiring section; and a synchronization information transmitting section to transmit synchronization information to the controllers, the synchronization information being used when the controllers receive data from each of the transmitters at the reference synchronization timing determined by the determining section; wherein:

the determining section determines, as the reference synchronization timing, a synchronization timing of a controller of the plurality of controllers which minimizes a delay with respect to each of synchronization timings of other controllers of the plurality of controllers.

\* \* \* \* \*